(12) United States Patent
Matsuzaki

(10) Patent No.: US 7,562,376 B2
(45) Date of Patent: Jul. 14, 2009

(54) INFORMATION PROCESSING APPARATUS, INFORMATION PROCESSING METHOD, BROADCAST SYSTEM, STORAGE MEDIUM, AND COMPUTER PROGRAM

(75) Inventor: Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 10/726,537

(22) Filed: Dec. 4, 2003

(65) Prior Publication Data
US 2004/0113929 A1 Jun. 17, 2004

(30) Foreign Application Priority Data
Dec. 13, 2002 (JP) ............... 2002-362702

(51) Int. Cl.
*H04N 5/445* (2006.01)
*G06F 3/00* (2006.01)
*G06F 13/00* (2006.01)

(52) U.S. Cl. ............... 725/43; 725/39; 725/40; 725/44; 725/45; 725/46; 725/47; 725/52; 725/56; 725/61; 348/569; 348/563

(58) Field of Classification Search ........... 725/39, 725/40, 43, 44, 45–47, 52, 56, 58, 61; 348/569, 348/563
See application file for complete search history.

(56) References Cited

U.S. PATENT DOCUMENTS

| | | | |
|---|---|---|---|
| 6,249,320 B1 * | 6/2001 | Schneidewend et al. | 348/569 |
| 6,292,624 B1 * | 9/2001 | Saib et al. | 386/83 |
| 6,324,338 B1 * | 11/2001 | Wood et al. | 386/83 |
| 6,359,636 B1 * | 3/2002 | Schindler et al. | 715/846 |
| 6,392,709 B1 | 5/2002 | Orito | 348/569 |
| 6,481,011 B1 * | 11/2002 | Lemmons | 725/47 |
| 6,792,617 B2 * | 9/2004 | Gorbatov et al. | 725/110 |
| 6,798,617 B2 * | 9/2004 | Misawa | 360/128 |

(Continued)

FOREIGN PATENT DOCUMENTS

EP 0 921 689 A2 6/1999

(Continued)

OTHER PUBLICATIONS

Nov. 27, 2007 European Search Report in European Patent Appln. No. 03 25 7697.

*Primary Examiner*—Jason P Salce
(74) *Attorney, Agent, or Firm*—Fitzpatrick, Cella, Harper & Scinto

(57) ABSTRACT

An information processing apparatus has the capability of making a registration for timer-controlled automatic viewing/recording not only in units of programs but also in units of sub-programs. The information processing apparatus includes a display control unit for displaying information on a display on the basis of the program information data such that when a program includes a plurality of sub-programs, sub-program information associated with sub-programs is displayed on the display, a processing unit for performing a specified process on sub-program content data of a sub-program included in the program content data received by the receiving means, and a timer-controlled automatic operation setting unit for specifying a sub-program indicated by the sub-program information displayed on the display and setting a timer-controlled automatic operation for the specified sub-program such that the specified process is to be performed on the specified sub-program at a specified time.

4 Claims, 36 Drawing Sheets

U.S. PATENT DOCUMENTS

| | | |
|---|---|---|
| 6,798,971 B2 | 9/2004 | Potrebic .................... 386/46 |
| 7,065,777 B2 | 6/2006 | Inoue ......................... 725/39 |
| 7,197,758 B1 * | 3/2007 | Blackketter et al. .......... 725/37 |
| 2002/0038457 A1 | 3/2002 | Numata et al. ............... 725/47 |
| 2002/0073425 A1 | 6/2002 | Arai et al. .................... 725/44 |
| 2002/0120925 A1 | 8/2002 | Logan .......................... 725/9 |
| 2002/0152474 A1 | 10/2002 | Dudkiewicz ............... 725/136 |
| 2004/0015989 A1 | 1/2004 | Kaizu et al. .................. 725/39 |

FOREIGN PATENT DOCUMENTS

| | | |
|---|---|---|
| JP | 10-269752 | 10/1998 |
| JP | 11-155110 | 6/1999 |
| JP | 2002-112142 | 4/2002 |
| JP | 2002-125169 | 4/2002 |
| KR | 1999-62818 | 7/1999 |
| KR | 1999-63244 | 7/1999 |
| WO | WO 98/38831 | 9/1998 |
| WO | WO 99/45701 | 9/1999 |
| WO | WO 02/32125 A1 | 4/2002 |

* cited by examiner

FIG. 3

| PROGRAM ID : △△△△△△ ||
|---|---|
| START TIME | PROGRAM |
| 21:00 | OPENING PROGRAM |
| 21:05 | NEWS 1 : STRONG EARTHQUAKE ABROAD |
| 21:20 | NEWS 2 : ACCIDENT |
| 21:35 | NEWS 3 : AUTUMN FESTIVAL |
| 21:45 | NEWS 4 : EVENTS AT VARIOUS PLACES |
| 21:55 | SPORTS |
| 22:20 | TALK SHOW (NANAKO HANASAKI) |
| 22:35 | TODAY'S NEWS |
| 22:40 | WEATHER FORECAST |

| | CH101 | CH102 | CH103 | CH104 | CH105 | CH106 | CH107 |
|---|---|---|---|---|---|---|---|
| 21:00 | MUSIC 11 | DRAMA 21 | PROGRAM 31 | PROGRAM 41<br>☐ OPENING PROGRAM<br>☐ NEWS 1 STRONG EARTHQUAKE ABROAD<br>☐ NEWS 2 ACCIDENT<br>☐ NEWS 3 AUTUMN FESTIVAL<br>☐ NEWS 4 EVENTS AT VARIOUS PLACES<br>■ SPORTS<br>☐ TALK SHOW (GUEST:*****)<br>☐ TODAY'S NEWS<br>☐ WEATHER FORECAST ★ | DRAMA 51 | MOVIE 61 | MOVIE 71 |
| 21:30 | WEATHER FORECAST 12 ☆ | | SPORTS 32 | | | | |
| 22:00 | MUSIC 13 | NEWS 22 | | | | | |
| | | PROGRAM 23 | | | | | |
| 22:30 | ☆ | PROGRAM 24 | | PROGRAM 42 | PROGRAM 52 | | |

431 points to PROGRAM 41. 430 labels the overall guide.

FIG. 5

| | CH101 | CH102 | CH103 | CH104 | CH105 | CH106 | CH107 |
|---|---|---|---|---|---|---|---|
| 21:00 | MUSIC 11 | DRAMA 21 | PROGRAM 31 | PROGRAM 41 | DRAMA 51 | MOVIE 61 | MOVIE 71 |
| 21:30 | ☆ | | SPORTS 32 | | | | |
| 22:00 | WEATHER FORECAST 12 | NEWS 22 | | | | | |
| | MUSIC 13 | PROGRAM 23 | | | | | |
| 22:30 | ☆ | PROGRAM 24 | | PROGRAM 42 ★ | PROGRAM 52 | | |

| | CH101 | CH102 | CH103 | CH104 | CH105 | CH106 | CH107 |
|---|---|---|---|---|---|---|---|
| 21:00 | MUSIC 11 ☆ | DRAMA 21 | PROGRAM 31 | PROGRAM 41 | DRAMA 51 | MOVIE 61 | MOVIE 71 |
| 21:30 | | | SPORTS 32 | | | | |
| 22:00 | WEATHER FORECAST 12 | NEWS 22 | | | | | |
| | MUSIC 13 | PROGRAM 23 | | | | | |
| 22:30 | ☆ | PROGRAM 24 | | PROGRAM 42 ☆ | PROGRAM 52 | | |

|  | CH101 | CH102 | CH103 | CH104 | CH105 | CH106 | CH107 |
|---|---|---|---|---|---|---|---|
| 21:00 | MUSIC 11 | DRAMA 21 | PROGRAM 31 | PROGRAM 41<br>☐ OPENING PROGRAM<br>☐ NEWS 1 STRONG EARTHQUAKE ABROAD<br>☐ NEWS 2 ACCIDENT<br>☐ NEWS 3 AUTUMN FESTIVAL<br>☐ NEWS 4 EVENTS AT VARIOUS PLACES<br>☐ SPORTS<br>☐ TALK SHOW (GUEST:****)<br>☐ TODAY'S NEWS | DRAMA 51 | MOVIE 61 | MOVIE 71 |
| 21:30 | ☆ WEATHER FORECAST 12 | NEWS 22 | SPORTS 32 | | | | |
| 22:00 | MUSIC 13 | PROGRAM 23 | | | | | |
| 22:30 | ☆ | PROGRAM 24 | | | PROGRAM 52 | | |

ANOTHER PROGRAM (CH111) IS ALREADY RESERVED AT THE SAME START TIME — 461

460

FIG. 9
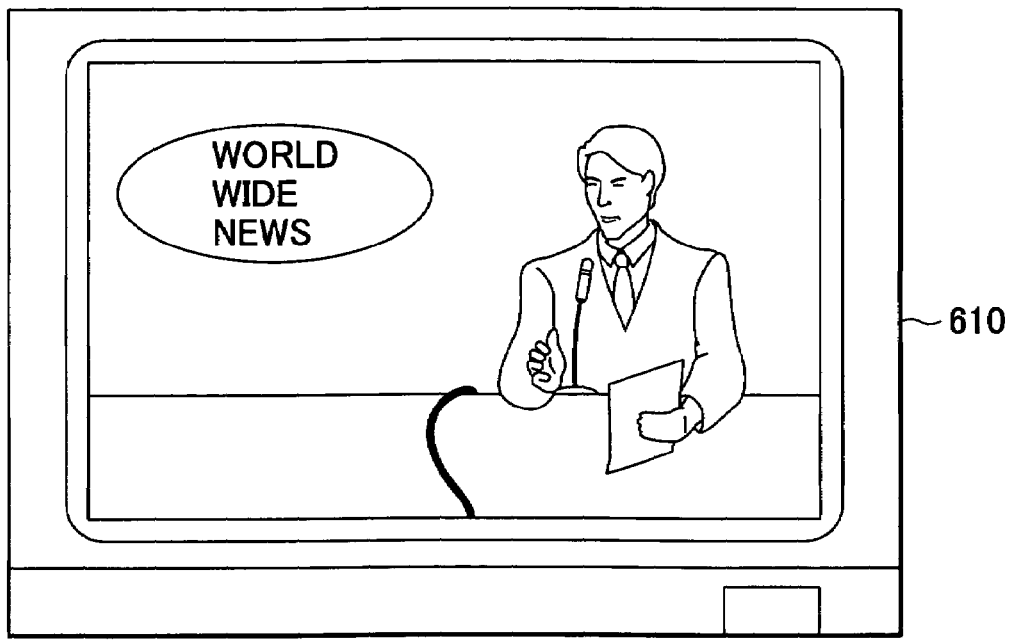
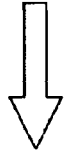

FIG. 11

| ↔ | CH101 | CH102 | CH103 | CH104 | CH105 | CH106 | CH107 |
|---|---|---|---|---|---|---|---|
| 18:00 | NEWS 14 | NEWS 26 | ANIME 33 | ANIME 45 | NEWS 55 | PROGRAM INFORMATION 63 | PROGRAM INFORMATION 73 |
| 19:00 | MUSIC 11 | PROGRAM 25 | PROGRAM 31 | PROGRAM 44 | PROGRAM 54 | MOVIE 62 | MOVIE 72 |
| 20:00 | | DRAMA 21 | | PROGRAM 43 | PROGRAM 53 | | |
| 21:00 | ☆ | | SPORTS 32 | PROGRAM 41 | DORAMA 51 | MOVIE 61 | MOVIE 71 |
| 22:00 | WEATHER FORECAST 12 | NEWS 22 | | | | | |
| | MUSIC 13 | MUSIC 23 | | | ☆ PROGRAM 52 | | |
| 23:30 | | | | PROGRAM 42 | | | |
| | ☆ | PROGRAM 24 | | | | | |

810

↓  811 / 811'

| ↔ | CH101 | CH102 | CH103 | CH104 | CH105 | CH106 | CH107 |
|---|---|---|---|---|---|---|---|
| 21:00 | MUSIC 11 | DRAMA 21 | PROGRAM 31 | PROGRAM 41' □OPENING PROGRAM □NEWS 1 STRONG EARTHQUAKE ABROAD □NEWS 2 ACCIDENT □NEWS 3 AUTUMN FESTIVAL □NEWS 4 EVENTS AT VARIOUS PLACES □SPORTS □TALK SHOW (GUEST:***) □TODAY'S NEWS □WEATHER FORECAST ☆ | DRAMA 51 | MOVIE 61 | MOVIE 71 |
| 21:30 | ☆ | | SPORTS 32 | | | | |
| 22:00 | WEATHER FORECAST 12 | NEWS 22 | | | | | |
| | MUSIC 13 | PROGRAM 23 | | | | | |
| 22:30 | | PROGRAM 24 | | | PROGRAM 52 | | |
| | ☆ | | | PROGRAM 42 | | | |

| \multicolumn{3}{c}{PROGRAM ID : △△△△△△} |||
|---|---|---|
| START TIME | PROGRAM | GENRE |
| 21:00 | OPENING PROGRAM | |
| 21:05 | NEWS 1 : STRONG EARTHQUAKE ABROAD | NEWS |
| 21:20 | NEWS 2 : ACCIDENT | NEWS |
| 21:35 | NEWS 3 : AUTUMN FESTIVAL | NEWS |
| 21:45 | NEWS 4 : EVENTS AT VARIOUS PLACES | NEWS |
| 21:55 | SPORTS | SPORTS |
| 22:20 | TALK SHOW (NANAKO HANASAKI) | |
| 22:35 | TODAY'S NEWS | NEWS |
| 22:40 | WEATHER FORECAST | WEATHER FORECAST |

FIG. 30

| | CH101 | CH102 | CH103 | CH104 | CH105 | CH106 | CH107 |
|---|---|---|---|---|---|---|---|
| 21:00 | MUSIC 11 | DRAMA 21 | PROGRAM 31 | PROGRAM 41<br>☐ OPENING PROGRAM<br>▨ NEWS 1 STRONG EARTHQUAKE ABROAD<br>▨ NEWS 2 ACCIDENT<br>▨ NEWS 3 AUTUMN FESTIVAL<br>▨ NEWS 4 EVENTS AT VARIOUS PLACES<br>■ SPORTS<br>☐ TALK SHOW (GUEST:***)<br>☐ TODAY'S NEWS<br>▨ WEATHER FORECAST ☆ | DRAMA 51 | MOVIE 61 | MOVIE 71 |
| 21:30 | WEATHER FORECAST 12 | NEWS 22 | SPORTS 32<br>☐ TRACK<br>☐ MARATHON<br>☐ BASKETBALL<br>☐ TENNIS | | | | |
| 22:00 | MUSIC 13<br>☐ BEST TEN OF JAPANESE MUSIC 10 | PROGRAM 23 | | | | | |
| 22:30 | ☐ BEST TEN OF EUROPEAN MUSIC 10<br>☐ FEATURE PROGRAM ☆ | PROGRAM 24 | | PROGRAM 42 | PROGRAM 52 | | |

1901

1920

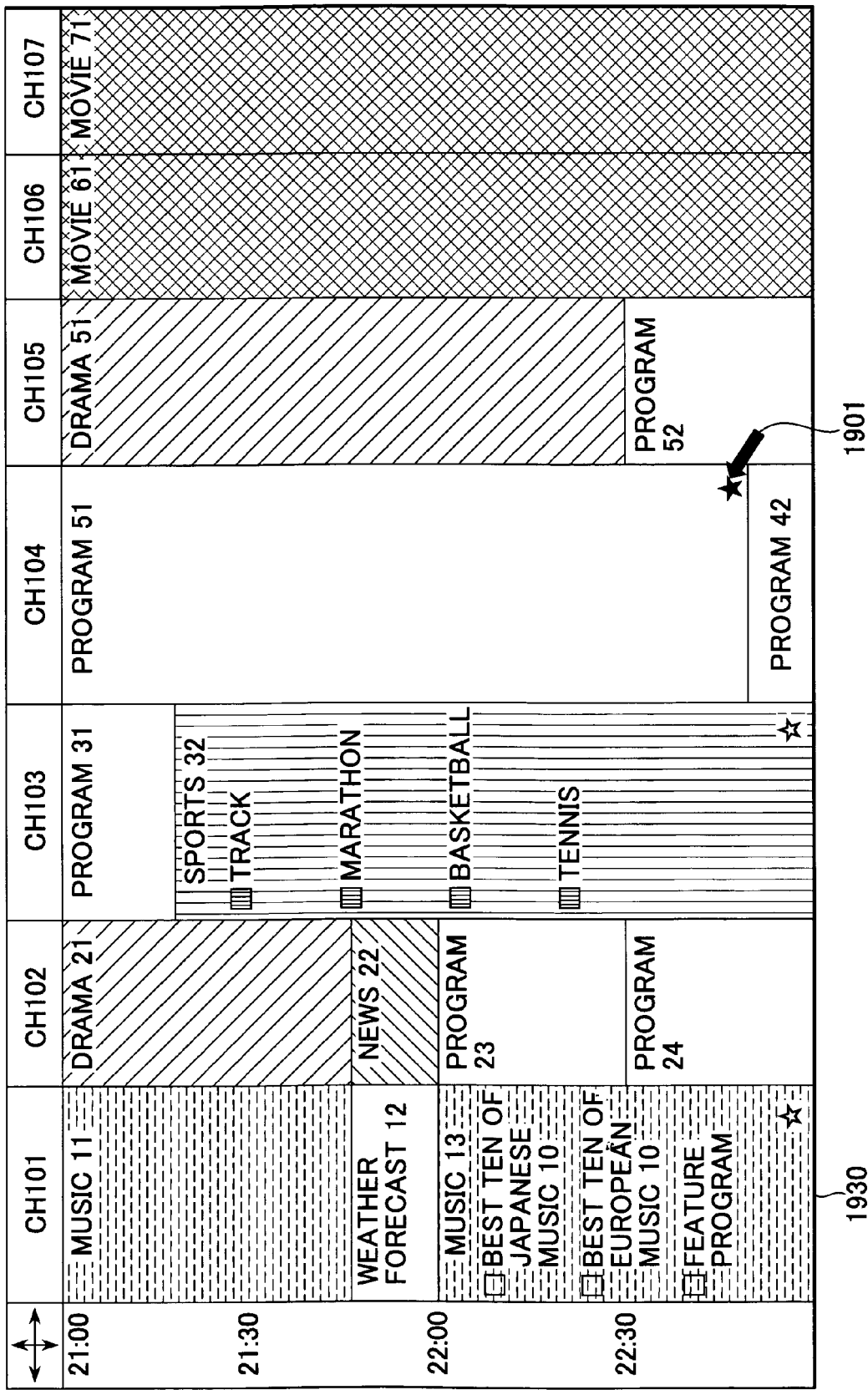

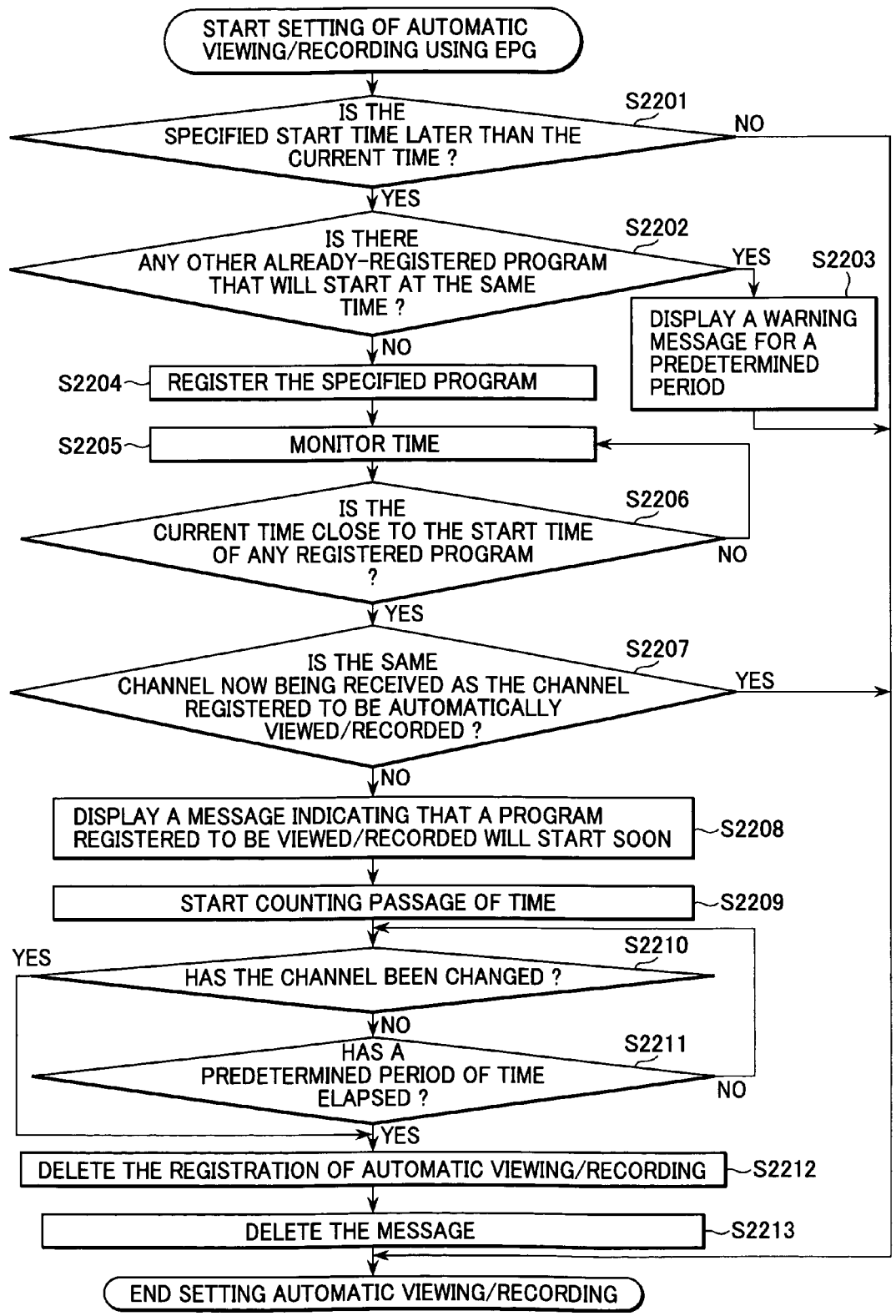

FIG. 34

|  | ALL GENRES | SPORTS | NEWS | WEATHER FORECAST | DRAMA | MOVIE |  |
|---|---|---|---|---|---|---|---|
|  | CH101 | CH102 | CH103 | CH104 | CH105 | CH106 | CH107 |
| 21:00 | MUSIC 11 | DRAMA 21 | PROGRAM 31 | PROGRAM 41<br>□ OPENING PROGRAM<br>▨ NEWS 1 STRONG EARTHQUAKE ABROAD<br>▨ NEWS 2 ACCIDENT<br>▨ NEWS 3 AUTUMN FESTIVAL<br>▨ NEWS 4 EVENTS AT VARIOUS PLACES<br>▤ SPORTS<br>□ TALK SHOW (GUEST:***)<br>▨ TODAY'S NEWS<br>▩ WEATHER FORECAST ☆ | DRAMA 51 | MOVIE 61 | MOVIE 71 |
| 21:30 | WEATHER FORECAST 12 | NEWS 22 | SPORTS 32<br>▤ TRACK<br>▤ MARATHON<br>▤ BASKETBALL<br>▤ TENNIS ☆ | | | | |
| 22:00 | MUSIC 13<br>□ BEST TEN OF JAPANESE MUSIC 10<br>□ BEST TEN OF EUROPEAN MUSIC 10<br>□ FEATURE PROGRAM ☆ | PROGRAM 23 | | | | | |
| 22:30 | | PROGRAM 24 | | PROGRAM 42 | PROGRAM 52 | | |

FIG. 35

| | ALL GENRES | SPORTS | NEWS | WEATHER FORECAST | DRAMA | MOVIE | |
|---|---|---|---|---|---|---|---|
| | CH101 | CH102 | CH103 | CH104 | CH105 | CH106 | CH107 |
| 21:00 | MUSIC 11 | DRAMA 21 | PROGRAM 31 | PROGRAM 41<br>☐ OPENING PROGRAM<br>☐ NEWS 1 STRONG EARTHQUAKE ABROAD<br>☐ NEWS 2 ACCIDENT<br>☐ NEWS 3 AUTUMN FESTIVAL<br>☐ NEWS 4 EVENTS AT VARIOUS PLACES<br>☐ SPORTS<br>☐ TALK SHOW (GUEST:***)<br>☐ TODAY'S NEWS ☆<br>☐ WEATHER FORECAST | DRAMA 51 | MOVIE 61 | MOVIE 71 |
| 21:30 | WEATHER FORECAST 12 | | SPORTS 32<br>☐ TRACK<br>☐ MARATHON<br>☐ BASKETBALL<br>☐ TENNIS | | | | |
| 22:00 | MUSIC 13<br>☐ BEST TEN OF JAPANESE MUSIC 10<br>☐ BEST TEN OF EUROPEAN MUSIC 10<br>☐ FEATURE PROGRAM | NEWS 22 | | | | | |
| | | PROGRAM 23 | | | | | |
| 22:30 | ☆ | PROGRAM 24 | ☆ | PROGRAM 42 | PROGRAM 52 | | |

2301 (MOVIE arrow indicator)
2310

FIG. 36

| | ALL GENRES | NEWS | WEATHER FORECAST | DRAMA | MOVIE | MUSIC | |
| --- | --- | --- | --- | --- | --- | --- | --- |
| | CH101 | CH102 | CH103 | CH104 | CH105 | CH106 | CH107 |
| 21:00 | MUSIC 11 | DRAMA 21 | PROGRAM 31 | PROGRAM 41<br>☐ OPENING PROGRAM<br>☐ NEWS 1 STRONG EARTHQUAKE ABROAD<br>☐ NEWS 2 ACCIDENT<br>☐ NEWS 3 AUTUMN FESTIVAL<br>☐ NEWS 4 EVENTS AT VARIOUS PLACES<br>☐ SPORTS<br>☐ TALK SHOW (GUEST:***)<br>☐ TODAY'S NEWS ☆<br>☐ WEATHER FORECAST | DRAMA 51 | MOVIE 61 | MOVIE 71 |
| 21:30 | WEATHER FORECAST 12 | NEWS 22 | SPORTS 32<br>☐ TRACK<br>☐ MARATHON<br>☐ BASKETBALL<br>☐ TENNIS | | | | |
| 22:00 | MUSIC 13<br>☐ BEST TEN OF JAPANESE MUSIC 10<br>☐ BEST TEN OF EUROPEAN MUSIC 10<br>☐ FEATURE PROGRAM | PROGRAM 23 | | | | | |
| 22:30 | | PROGRAM 24 | | PROGRAM 42 | PROGRAM 52 | | |

2302 2301 2303 2320

INFORMATION PROCESSING APPARATUS, INFORMATION PROCESSING METHOD, BROADCAST SYSTEM, STORAGE MEDIUM, AND COMPUTER PROGRAM

BACKGROUND OF THE INVENTION

1. Field of the Invention

The present invention relates to an information processing apparatus, an information processing method, a television program broadcast system, a computer program for implementing the information processing method, and a computer-readable storage medium on which the computer program is stored, for use in a digital television receiver capable of displaying and/or recording a television program in a timer-controlled automatic operation mode.

2. Description of the Related Art

The television broadcast system is now in the middle of transition from that based on analog technology to that based on digital technology. The innovation in the digital television technique has made it possible to use television broadcast as an advanced information and communication medium. In Japan, digital television broadcast service using a broadcast satellite has begun.

An advantage of the digital television broadcast is that not only video data and audio data but also other various kinds of data can be provided in an integrated form. Another advantage of the digital television broadcast is that a greater number of channels can be transmitted than can be transmitted by the analog television broadcast technique. For example, in CS digital broadcast service called "Sky Perfect TV", a large number of channels greater than 100 channels are available.

However, the large number of channels can cause users to have difficulty in selecting a desired television program from the large number of programs.

In digital broadcast service, to avoid the above problem, program information for use in selecting a desired program is provided to users (viewers).

More specifically, a television program provider (in a broadcast station) broadcasts program information associated with television programs in addition to television program content data. In a television receiver at a user, an electronic program guide (EPG) table is produced on the basis of the received program information and the resultant EPG table is displayed on the screen of the television receiver. The program information includes a program identification number, a program name, a broadcast channel, the genre of the program, a description of the program content such as a description of the cast or the like, a broadcast date, a broadcast start time, and a broadcast end time.

From the EPG table displayed on the screen of the television receiver, the user can recognize what programs are being broadcast or will be broadcast, and the user can easily select a desired program from a large number of programs. Furthermore, on the EPG table, the user can set a desired program to be viewed/recorded in a timer-controlled automatic operation mode.

However, because information associated with a large number of programs is described in the form of text data in the EPG table, the user may still have some difficulty in finding a desired program of a desired genre.

To avoid the above problem, in producing the EPG table at the television receiver, it has been proposed to extract genre information from program information associated with television programs transmitted from the broadcast station, and to shade fields of programs in the EPG table with particular colors depending on the genres indicated by the genre information, thereby allowing the user to easily select a desired program of a desired genre.

However, in the conventional television receiver, it is not allowed to set the timer-controlled automatic operation on the EPG table in units of sub-programs, although setting is allowed in units of programs.

For example, when a program includes a plurality of sub-programs such as a news program, a sports program, a feature program, and a weather forecast program, a user cannot designate a particular one (for example, the sports program) of those sub-programs to be viewed/recorded in the timer-controlled automatic operation mode, although it is allowed to designate the program as a whole to be viewed/recorded.

Furthermore, in the conventional television receiver, when the EPG table is produced, categorization is performed not in units of sub-programs but in units of programs. This makes it impossible to categorize a program when the program includes a plurality of sub-programs of different genres. For example, when a program broadcast at the end of a day includes sub-programs such as highlights of news of that day, highlights of sports games of that day, top-ranking music of that day, and weather forecast of next day, the program including those sub-programs cannot be categorized in a particular genre. Thus, such a program is not categorized, and a user cannot recognize the genre of the program.

SUMMARY OF THE INVENTION

In view of the above, a general object of the present invention is to solve the above problems.

More specifically, an object of the present invention is to provide an information processing apparatus, an information processing method, a television program broadcast system, a computer program for implementing the information processing method, and a computer-readable storage medium on which the computer program is stored, in which setting of a timer-controlled automatic operation is allowed not only in units of programs but also in units of sub-programs.

More specifically, when a television program (hereinafter referred to simply as a program unless distinguishing from computer programs is necessary) includes a plurality of television sub-programs (hereinafter referred to simply as sub-programs unless distinguishing from computer sub-programs is necessary), a television receiver receives sub-program information indicating titles of respective sub-programs of programs transmitted together with program information from a broadcast station, and the television receiver produces an EPG table on the basis of the program information and the sub-program information such that each of sub-programs of each program can be set to be viewed/recorded in the timer-controlled automatic operation mode.

Another object of the present invention is to provide an information processing apparatus, an information processing method, a television program broadcast system, a computer program for implementing the information processing method, and a computer-readable storage medium on which the computer program is stored, in which even in a case in which a program includes various genres of sub-programs, an EPG table is produced in such a manner that that the genres of respective sub-programs can be easily recognized.

More specifically, in the case in which a program includes a plurality of sub-programs, a television receiver receives sub-program information indicating titles of respective sub-programs of programs transmitted together with program information from a broadcast station, and the television receiver produces an EPG table on the basis of the program information and the sub-program information in such a manner that each sub-program is categorized on the basis of the genre information included in the program information and in the sub-program information, and information of each sub-program in the EPG table is expressed with color depending on the genre, thereby making it possible to perform categorization even when a program includes various genres of sub-programs.

In an aspect, the present invention provides an information processing apparatus for processing program content data and program information data associated with a program received via receiving means, comprising display control means for displaying information on display means on the basis of the program information data such that when a program includes a plurality of sub-programs, sub-program information associated with sub-programs is displayed on the display means, processing means for performing a specified process on sub-program content data of a sub-program included in the program content data received by the receiving means, and timer-controlled automatic operation setting means for specifying a sub-program indicated by the sub-program information displayed on the display means and setting timer-controlled automatic operation for the specified sub-program such that the specified process is to be performed on the specified sub-program at a specified time.

In another aspect, the present invention provides an information processing apparatus for receiving television broadcast program data and processing it, comprising acquisition means for, when program data including a plurality of sub-program data is received as the television broadcast program data, acquiring sub-program data including at least one of video data, audio data, and text data and also acquiring information associated with sub-programs from the received program data, and display means for displaying a screen on the basis of the sub-program information acquired by the acquisition means in such a manner that each of sub-programs is colored in accordance with a genre of the sub-program determined on the basis of the sub-program information.

In another aspect, the present invention provides an information processing method for processing television broadcast program content data and program information data associated with a program received in a receiving step, comprising a display control step for displaying information on display means on the basis of the program information data such that when a program includes a plurality of sub-programs, sub-program information associated with sub-programs is displayed on the display means, a processing step for performing a specified process on sub-program content data of a sub-program included in the program content data received in the receiving step, and a timer-controlled automatic process setting step for specifying a sub-program indicated by the sub-program information displayed on the display means and setting timer-controlled automatic operation for the specified sub-program such that the specified process is to be performed on the specified sub-program at a specified time.

In another aspect, the present invention provides an information processing method for receiving television broadcast program data and processing it, comprising an acquisition step for, when program data including a plurality of sub-program data is received as the television broadcast program data, acquiring sub-program data including at least one of video data, audio data, and text data and also acquiring information associated with sub-programs from the received program data, and a displaying step for displaying a screen on the basis of the sub-program information acquired in the acquisition step in such a manner that each of sub-programs is colored in accordance with a genre of the sub-program determined on the basis of the sub-program information.

More specifically, in a television broadcast system according to the present invention, in a case in which television broadcast program data transmitted from a broadcast apparatus includes video information (program content data), audio information (program content data), and program information indicating titles and/or the like of respective programs wherein one or more programs each include a plurality of sub-programs, the broadcast apparatus codes the video information, the audio information, and the program information (also referred to as associated data), multiplexes the coded information, modulates the multiplexed information, and transmits the resultant modulated information.

A television receiver receives information transmitted from the broadcast apparatus, demodulates the received information, demultiplexes the demodulated information into video information, audio information, and program information, decodes the video information, the audio information, and the program information, and displays the decoded video information in synchronization with the audio information.

More particularly, the television receiver extracts the program information (indicating titles and/or the like of respective programs) from the received information, and, if a program includes a plurality of sub-programs, the television receiver extracts sub-program information indicating titles and/or the like of respective sub-programs (the term "program information" is also used to generically express those kinds of information). On the basis of the extracted information, the television receiver produces an EPG table and displays it on the screen of the television receiver. If a program or a sub-program is selected on the EPG table displayed on the screen, the television receiver registers the selected program or sub-program as program registration information (indicating what program or sub-program should be received and/or recorded at what time in a timer-controlled automatic operation mode), and the television receiver monitors passage of time to detect arrival of the start time of the registered program or sub-program (so that receiving/recording of the registered program or sub-program should be started at the start time). If the television receiver detects that it has come close to the start time of the registered program or sub-program, the television receiver determines whether the channel of a program being currently received and displayed is identical to the channel of the registered program or sub-program to be viewed/recorded in the timer-controlled automatic operation mode. If it is determined that the channel of the program being currently received and displayed is not identical to the channel of the registered program or sub-program, the television receiver displays a message to inform the user that the time-controlled automatic operation (viewing and/or recording) of the registered program or sub-program is going to start.

Thus, in the present invention, when each program includes a plurality of sub-programs, the broadcast apparatus transmits program information indicating titles and/or the like of respective programs and sub-program information indicating titles and/or the like of respective sub-programs, and the television receiver produces an EPG table on the basis of the received program information and sub-program information so that registration for timer-controlled viewing/recording can be made via the EPG table not only in units of programs but also in units of sub-programs.

The television receiver may also be constructed so as to operate as follows. In a case in which the television receiver determines that the channel of a program being currently received and displayed is not identical to the channel of a registered program or sub-program to be viewed/recorded in the timer-controlled automatic operation mode, the channel of the program being currently received and displayed is forcedly switched to the channel of the registered program or sub-program.

Alternatively, in the case in which the television receiver determines that the channel of a program being currently received and displayed is not identical to the channel of a registered program or sub-program to be viewed/recorded in the timer-controlled automatic operation mode, the television receiver may convert the video image of the registered program or sub-program into a video image with a size smaller than the full-screen size of the display and may display the resultant small-sized video image such that it is overlaid on the video image being currently displayed.

Alternatively, in the case in which the television receiver determines that the channel of a program being currently received and displayed is not identical to the channel of a registered program or sub-program to be viewed/recorded in the timer-controlled automatic operation mode, the television receiver may convert the video image of the registered program or sub-program into a video image with a size smaller than the full-screen size of the display and also convert the video image of the video image being currently displayed into a video image with a size smaller than the full-screen size of the display but greater than the size of the video image of the registered program or sub-program, and the television receiver may display a composite video image of the above two video images.

The television receiver may include a power supply for supplying electric power to the entire television receiver in a normal operation state and also a power supply for supplying a part of the television receiver in a waiting state in which passage of time is monitored. In the waiting state, if the television receiver detects that it has come close to the start time of a registered program or sub-program to be viewed/recorded in the timer-controlled automatic operation mode, the electric power is supplied to the entire television receiver. If the electric power is supplied to the entire television receiver, the television receiver displays a message to inform a user that the registered program or sub-program is going to start. If an operation of displaying the video image of the registered program or sub-program is not performed during a predetermined period of time after starting displaying the message, the electric power to the entire television receiver is turned off and the electric power for use in the waiting state is turned on.

In the television receiver, when a user clicks a mark indicating that sub-program information of a program is available, if it is determined that sub-program information is too much to display all sub-program information in a given field of the program in the EPG table, the full-scale value in the time direction of the EPG table is reduced thereby expanding the area of the field of that program so that all sub-program information can be displayed therein.

In the television receiver, when a program or a sub-program is selected from programs or sub-programs displayed in the EPG table, if the selected program or sub-program has overlap in terms of time with another already-registered program or sub-program, a message is displayed to inform the user that the selected program or sub-program has overlap in terms of time with another already-registered program or sub-program.

The sub-program information may include, in addition to titles of respective sub-programs, start times of respective sub-programs and information pointing to a program to which the sub-programs belong.

After a sub-program indicated by sub-program information displayed on the EPG table is selected and registered for time-controlled viewing/recording, if the hidden mode is selected to hide the sub-program information of the registered sub-program, then, when information indicating that sub-program information associated with the program is available is added to the EPG table, qualification information indicating that there is a sub-program registered for timer-controlled viewing/recording is added to the information indicating that sub-program information associated with the program is available. The qualification information may include information indicating the color or the shape of to be applied to the information indicating that sub-program information associated with the program is available.

In another aspect of the television broadcast system according to the present invention, in a case in which television broadcast program data transmitted from a broadcast apparatus includes video information, audio information, and program information indicating titles and/or the like of respective programs wherein one or more programs each include a plurality of sub-programs, the broadcast apparatus codes the video information, the audio information, and the program information (also referred to as associated data), multiplexes the coded information, modulates the multiplexed information, and transmits the resultant modulated information. A television receiver receives information transmitted from the broadcast apparatus, demodulates the received information, demultiplexes the demodulated information into video information, audio information, and program information, decodes the video information, the audio information, and the program information, and displays the decoded video information in synchronization with the audio information.

More particularly, the television receiver extracts the program information (indicating titles and/or the like of respective programs) from the received information, and, if a program includes a plurality of sub-programs, the television receiver extracts sub-program information indicating titles and/or the like of respective sub-programs (the term "program information" is also used to generically express those kinds of information). On the basis of the extracted information, the television receiver produces an EPG table and displays it on the screen of the television receiver. In the above process, programs and sub-programs are categorized on the basis of genre information included in the program information or sub-program information, and the genres of respective programs or sub-programs are expressed by colors in the EPG table.

In the present invention, categorization is possible even in the case in which a program includes a various genres of sub-programs. For example, when a user wants to know the results of sports games, the user can easily find a sub-program of the genre of "sports" included in a program even if the program includes various genres of sub-programs such as news, top-ranked music, weather forecast in addition to the sports sub-program, because genres of the respective sub-programs are expressed by colors.

The television receiver may also be constructed so as to operate as follows. The television receiver displays an EPG table such that genres of programs or sub-programs are expressed by colors.

In the television receiver, if one or more genres are selected on the EPG table, only the programs or sub-programs of the selected genres are colored.

The colors of the respective genres of programs or sub-programs are set in accordance with a command given from the outside.

In the television receiver, it is possible to select whether sub-program information is displayed or not in a corresponding field of a program in the EPG table. If it is selected not to display sub-program information, a mark is displayed to indicate that sub-program information associated with a program is available.

The program information includes genre information indicating genres of respective programs, and the sub-program information includes information indicating the start time and the genre of each sub-program and also includes information pointing to a program to which each sub-program belongs.

Further objects, features and advantages of the present invention will become apparent from the following description of the preferred embodiments with reference to the attached drawings.

BRIEF DESCRIPTION OF THE DRAWINGS

FIG. 3 is a diagram showing an example of sub-program information of a program included in the electronic program guide table.

FIG. 4 is a diagram showing an example of an electronic program guide table displayed on a screen of a display.

FIG. 5 is a diagram showing an example of an electronic program guide table in a state in which sub-program information is hidden.

FIG. 6 is a diagram showing an example of an electronic program guide table in a state in which the whole of a program is registered for timer-controlled viewing/recording.

FIG. 7 is a diagram showing a warning message displayed on an electronic program guide table to inform a user that registration of a program or a sub-program on an electronic program guide table will interfere with another already-registered program or sub-program having the same start time.

FIG. 9 is diagram showing a message displayed on the screen of the television receiver to inform a user that a registered program or sub-program will start soon.

FIG. 11 is a diagram showing a manner in which sub-program information is displayed in an electronic program guide table on the screen of the television receiver.

FIG. 26 is a diagram showing an example of sub-program information.

FIG. 30 is a diagram showing an example of an electronic program guide table in a state in which a sub-program is registered for timer-controlled viewing/recording.

FIG. 31 is a diagram showing an example of an electronic program guide table in a state in which sub-program information is hidden after a sub-program is registered for timer-controlled viewing/recording.

FIG. 32 is a flowchart showing a process performed by the television receiver.

FIG. 34 is a diagram showing an example of an electronic program guide table displayed on the television receiver, according to an eighth embodiment of the present invention.

FIG. 35 is a diagram showing an example of an electronic program guide table in a state in which a genre tab (a "drama" tab in this specific example) is selected.

FIG. 36 is a diagram showing an example of an electronic program guide table in a state in which genre tabs are slid.

DESCRIPTION OF THE PREFERRED EMBODIMENTS

The present invention is described in further detail below with reference to preferred embodiments in conjunction with accompanying drawings.

First Embodiment

Figure 1:
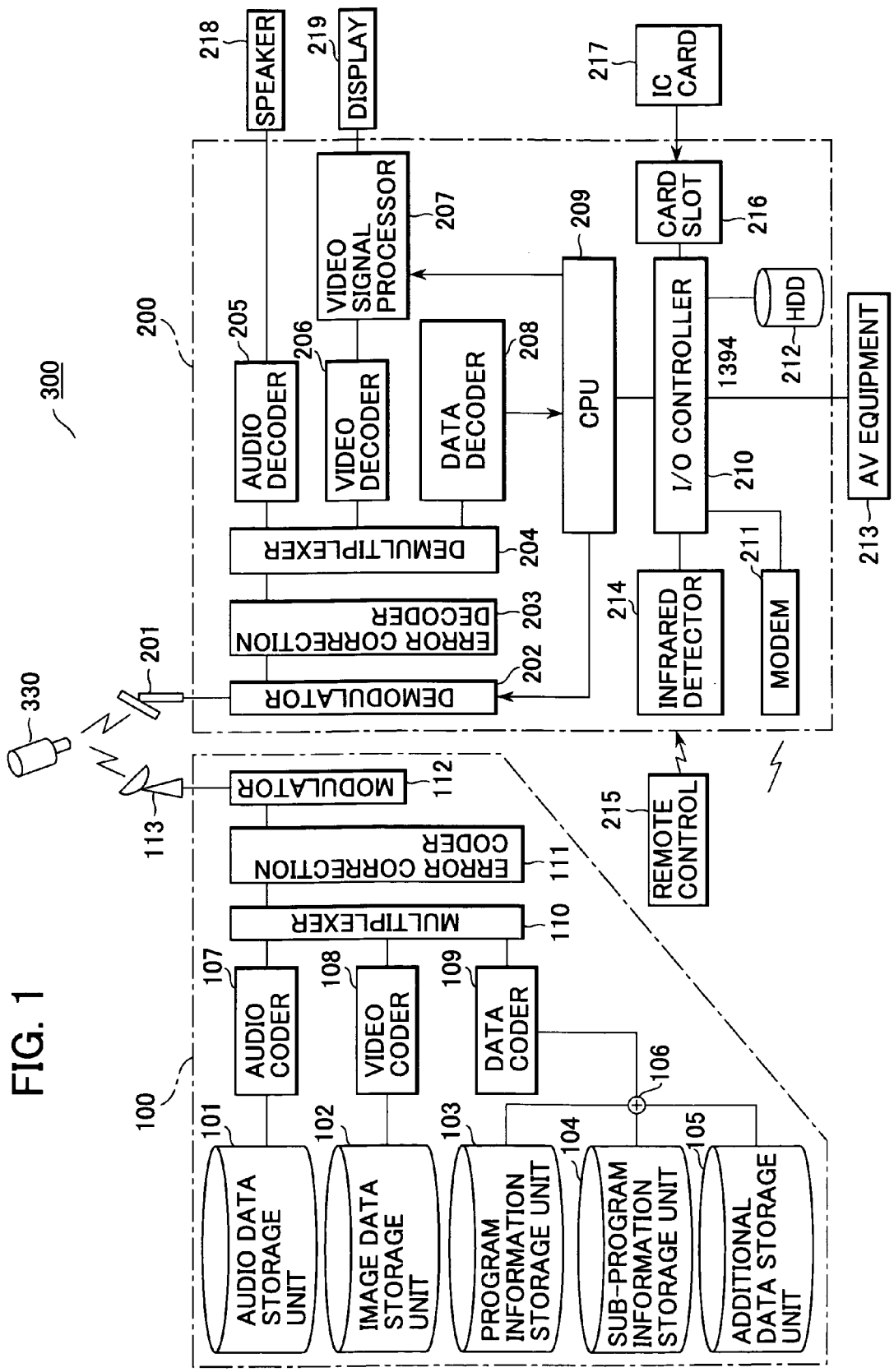
FIG. 1 is a block diagram showing a digital satellite broadcast system according to a first embodiment of the present invention.

The present invention may be applied to, for example, a digital satellite broadcast system 300 shown in FIG. 1.

General Construction of Digital Satellite Broadcast System

As shown in FIG. 1, the digital satellite broadcast system 300 includes a broadcast apparatus 100 disposed at a broadcast station, a television receiver 200, and a satellite 330 disposed in space. The broadcast apparatus 100 modulates television data including video data, audio data, and other data and transmits (broadcasts) the resultant modulated television data as a broadcast radiowave. The television receiver 200 receives the radiowave transmitted from the broadcast apparatus 100. The broadcast radiowave transmitted from the broadcast apparatus 100 is received by the satellite 330 and retransmitted therefrom such that the broadcast radiowave can be received by television receivers over a wide area on the ground.

Construction and Operation of Broadcast Apparatus

The broadcast apparatus 100 includes an audio data storage unit 101, a video data storage unit 102, a program information storage unit 103, a sub-program information storage unit 104, an additional data storage unit 105, a mixer 106, an audio coder 107, a video coder 108, a data coder 109, a multiplexer 110, an error correction coder 111, a modulator 112, and a transmission antenna 113.

In the broadcast apparatus 100, audio data associated with TV programs are stored in the audio data storage unit 101, and video data associated with TV programs are stored in the video data storage unit 102. Program information associated with TV programs is stored in the program information storage unit 103, and sub-program information associated with TV sub-programs is stored in the sub-program storage unit 104. Additional data associated with TV programs are stored in the additional data storage unit 105.

The audio coder 107 encodes audio data supplied from the audio data storage unit 101. The video coder 108 encodes video data supplied from the video data storage unit 102.

The encoding of video data is performed using a moving picture compression technique (high-efficiency coding technique) according to, for example, the MPEG2 (Moving Picture Experts Group phase 2) standard. The encoding of audio data is performed, for example, using a high-efficient multi-channel audio coding technique such as "AC-3" (Audio Coding-3) developed by Dolby Laboratories Inc. or using AAC" (Advanced Audio Coding) that is a part, associated with audio data, of the MPEG2 standard.

The mixer 106 combines program information supplied from the program information storage unit 103, sub-program information supplied from the sub-program information storage unit 104, and additional data supplied from the additional data storage unit 105 into a single piece of data. The resultant combined data is supplied to the data coder 109. The data coder 109 encodes the data received from the mixer 106.

The encoding of the data is performed, for example, using a lossless coding technique such as a run length coding technique that allows data to be encoded into a form that can be decoded into original information by the television receiver 200 without any loss of information.

The multiplexer 110 multiplexes the encoded audio data supplied from the audio coder 107, the encoded video data supplied from the video coder 108, and the encoded composite data (additional data) supplied from the data coder 109 into a single signal stream.

The error correction coder 111 adds error correction information to the multiplexed data output from the multiplexer 110. The addition of the error correction information makes it possible to detect and correct an error such as a loss or conversion to a wrong data value due to, for example, interference that may occur during the propagation of the multiplexed data from the broadcast apparatus 100 to the television receiver 200 via the satellite 330.

After the error correction information is added to the multiplexed data, the resultant data is supplied to the modulator 112, which modulates the data (digital broadcast data) supplied from the error correction coder 111. The resultant data is transmitted in the form of a broadcast radiowave from the transmission antenna 113 to the satellite 330. The modulation by the modulator 112 is performed using a digital modulation technique that can meet the requirement that as much data as possible be transmitted in a limited frequency bandwidth, such as 16-QAM (Quadrature Amplitude Modulation) that is one of multilevel modulation techniques, or OFDM (Orthogonal Frequency Division Multiplexing) that is one of multicarrier modulation techniques using a plurality of carriers.

Construction and Operation of Television Receiver

The television receiver 200 includes a receiving antenna 201, a demodulator 202, an error correction decoder 203, a demultiplexer 204, an audio decoder 205, a video decoder 206, a video signal processor 207, a data decoder 208, a CPU 209, a I/O controller 210, a modem 211, a hard disk 212, a AV device 213, an infrared receiver 214, a remote control 215, a card slot 216, a IC card 217, a speaker 218, and a display 219.

In the television receiver 200, the broadcast radiowave transmitted from the broadcast apparatus 100 and transferred by the satellite 330 is received by the receiving antenna 201. The demodulator 202 demodulates the radiowave received by the receiving antenna 201 thereby reproducing demodulated data (digital broadcast data).

The error correction decoder 203 extracts, from the broadcast data output from the demodulator 202, the error correction information added by the error correction coder 111 in the broadcast apparatus 100, and the error correction decoder 203 checks whether the received broadcast data includes an error such as a loss or conversion into a wrong data value. If an error is detected, the error correction decoder 203 corrects the error.

After completion of checking and correcting errors, the resultant data is supplied to the demultiplexer 204. The demultiplexer 204 separates the broadcast data supplied from the error correction decoder 203 into video data, audio data, and addition data including program information and sub-program information.

The audio decoder 205 decodes the audio data output from the demultiplexer 204 into original audio data and supplies the resultant decoded audio data to the speaker 218. The speaker 218 generates a voice/sound corresponding to the audio data.

The video decoder 206 decodes the video data output from the demultiplexer 204 into original video data and supplies the resultant decoded video data to the video signal processor 207. The video signal processor 207 produces composite video data by combining the video data supplied from the video decoder 206 with an electronic program guide table supplied from the CPU 209 and/or other video data, and the video signal processor 207 supplies the resultant composite video data to the external display 219 connected to the television receiver 200 (or a display (not shown) disposed on the television receiver 200).

The data decoder 208 decodes the data including the program information and the sub-program information supplied from the demultiplexer 204 into original data and supplies the resultant data to the CPU (controller) 209.

The CPU 209 is responsible for controlling the operation of the entire television receiver 200. More specifically, the operation performed by the CPU 209 includes production of an electronic program guide (EPG) table from program information and sub-program information included in the data output from the data decoder 208, production of image data on the basis of information supplied from various input/output devices (such as the AV device 213) via the I/O controller 210, and controlling of the AV device 213 via the I/O controller 210.

The image data produced by the CPU 209 is supplied to the video signal processor 207 and combined with the video data included in the broadcast data transmitted from the broadcast apparatus 100 as described above, and the resultant video data is displayed on the external display 219 connected to the television receiver 200 (or the display (not shown) disposed on the television receiver 200).

Under the control of the CPU 209, the I/O controller 210 controls inputting/outputting of data from/to the modem 211, the hard disk (HDD) 213, and the infrared receiver 214. The I/O controller 210 also controls inputting/outputting of data via the card slot 216 and also inputting/outputting data from/ to the AV (Audio Visual) device 213 via the high-speed IEEE1394 serial digital interface.

The infrared receiver 214 receives an infrared ray output from the remote control 215 operated by a user and extracts data from the infrared ray. The card slot 216 is used to insert the IC card 217 thereinto. If the IC card 217 is inserted into the card slot 216, authentication information of a user or the like is read therefrom.

Construction and Operation of Television Receiver

The most important feature of the present embodiment is in the television receiver 200. In the television receiver 200, when an EPG (electronic program guide) table is produced on the basis of program information and sub-program information included in broadcast data transmitted from the broadcast apparatus 100, the EPG table is produced such that each title of sub-program is displayed and any desired sub-program can be set, via the EPG table, to be viewed/recorded in the timer-controlled operation mode.

More specifically, the additional data included in the broadcast data transmitted from the broadcast apparatus 100 is separated by the demultiplexer 204 from the other data and then converted by the data decoder 208 into original data. The obtained original data is supplied to the CPU 209.

From the supplied additional data, the CPU 209 produces an EPG table as described below. First, from the supplied additional data, the CPU 209 extracts program information and sub-program information, necessary to produce the EPG table and produces the EPG table 410 on the basis of the program information such that channel numbers are described in a X direction and start times are described in a Y direction as shown in FIG. 2.

Figure 2:
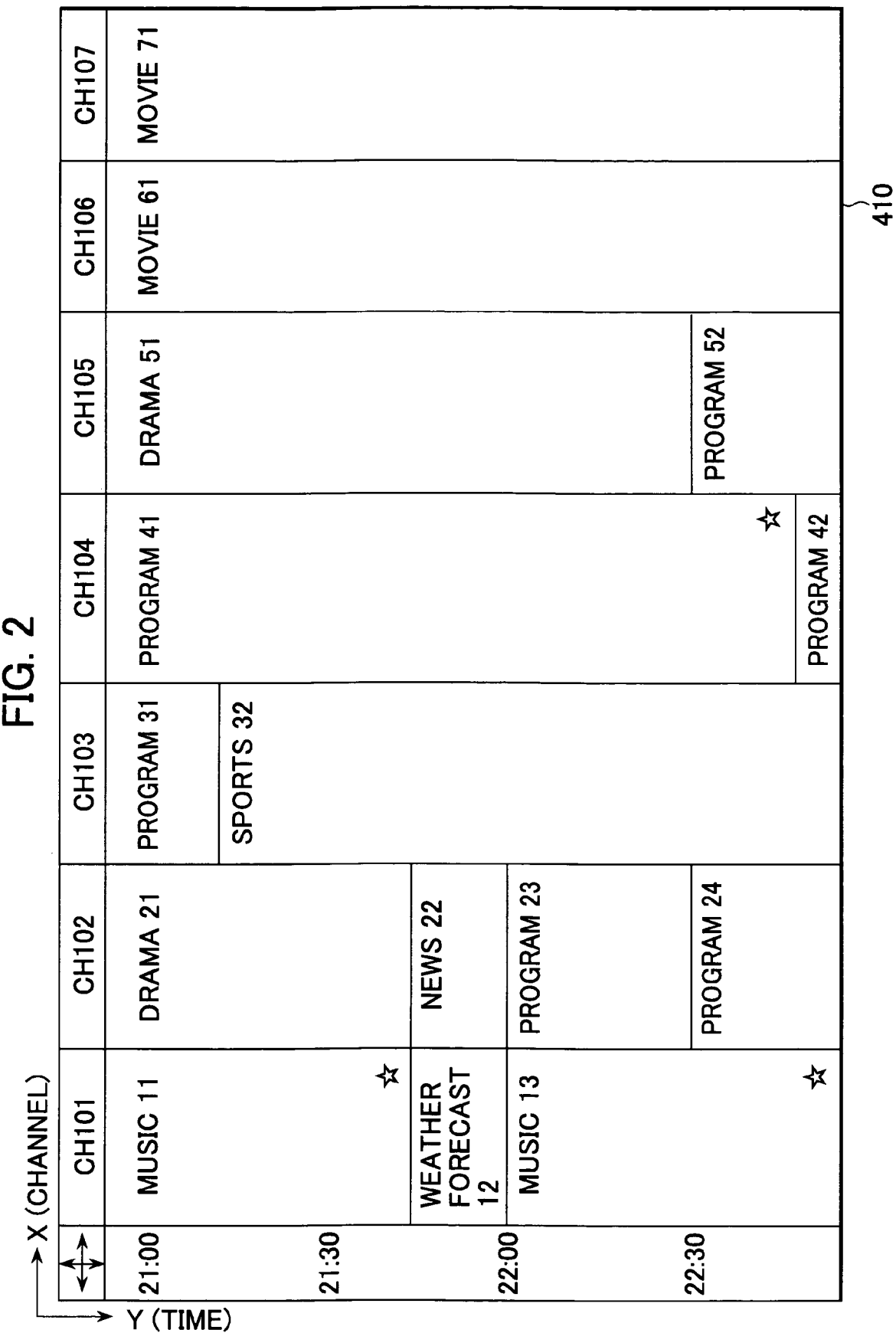
FIG. 2 is a diagram showing an electronic program guide table produced by a television receiver in the digital satellite broadcast system.

The CPU 209 determines whether the extracted sub-program information is related to a program in the produced EPG table 410 shown in FIG. 2.

FIG. 3 shows an example of sub-program information 420. As shown in FIG. 3, the sub-program information 420 includes a program number (program ID) identifying a program, titles of respective sub-programs in the program, and start times of the respective sub-programs.

If the CPU 209 determines that the extracted sub-program information is related to a certain program in the EPG table 410, the CPU 209 adds a particular mark to a field of that program in the EPG table 410 to indicate that the sub-program information associated with the program is available.

In the specific example shown in FIG. 2, a star-shaped mark is used for the above purpose. Marks are added to "music 11" and "music 13" in channel CH101 and also to "program 41" in channel CH 104 to indicate that sub-program information associated with "music 11" and "music 13" in channel CH101 and also "program 41" in channel CH 104 are available.

The EPG table 410 produced by the CPU 209 in the above-described manner is sent to the video signal processor 207. The video signal processor 207 combines the video data supplied from the video decoder 206 and the EPG table 410 supplied from the CPU 209 and displays the resultant composite video data on the display 219 (or the display unit (not shown) disposed on the television receiver 200).

An example of a manner of displaying an EPG table on the screen of the display 219 is described below. Switching of the EPG table and changing of information (associated with marks or colors) are performed by the video signal processor 207 under the control of the CPU 209.

FIG. 4 shows an example of the EPG table 430 displayed on the display 219. This EPG table 430 is produced on the basis of the EPG table 410 shown in FIG. 2, taking into account the fact that "program 41" has sub-program information 420 shown in FIG. 3.

As shown in FIG. 4, in this EPG table 430, sub-program information 420 associated with "program 41" is described in a field 431 of "program 41" in channel CH104. More specifically, in the field 431, titles of sub-programs (such as "opening", "news 1", etc) of "program 41" are described together with selection marks (check boxes) indicating whether sub-tiles are selected to be viewed/recorded in the timer-controlled automatic operation mode. In the example shown in FIG. 4, solid boxes are used to indicate that sub-programs are selected, and open boxes are used to indicate that sub-programs are not selected.

The titles of sub-programs in "program 41" are displayed at locations corresponding to their start times in the time axis of the EPG table so that a user can recognize their start times.

In the EPG table, selection of whether titles of sub-programs are displayed or not can be switched by clicking a corresponding star-shaped mark with a mouse cursor and further pressing an enter button. Alternatively, a special button for selecting whether titles of sub-programs are displayed or not may be provided on the remote control 215, and selection of whether titles of sub-programs are displayed or not may be switched in response to pressing the special button.

For example, when a user (viewer) wants to view only a sub-program with a title "sports" in "program 41" in the EPG table 430 shown in FIG. 4, the user checks the check box corresponding to the title "sports" (the open box changes into a solid box in response to checking the box) in the field 431 in which sub-program information is displayed. Checking of boxes may be performed, for example, by selecting a desired box using a cursor on the screen or operating an arrow key disposed on the remote control 215 and then pressing the enter key.

If setting the sub-program to be viewed/recorded in the timer-controlled automatic operation mode is completed, then, in the EPG table 430, the open box, indicating whether the sub-program is selected or not, changes into a solid box, and the open star mark, indicating that sub-program information is available, changes into a solid star mark.

Even when the hidden mode is selected by the user to hide the sub-program information, the mark (the solid star mark) remains in the EPG table to indicate that sub-program information is available and that the sub-program is registered for viewing/recording in the timer-controlled automatic operation mode. FIG. 5 shows an EPG table 440 in the above-described state. From the EPG table 440 in this state, the user (viewer) can recognize that some sub-program of "program 41" is set to be viewed/recorded in the timer-controlled automatic operation mode.

Setting of sub-programs to be viewed/recorded in the timer-controlled automatic operation mode is possible not only for a single sub-program but also a plurality of sub-programs. As a matter of course, it is also possible to set a whole program including all sub-programs to be viewed/recorded in the timer-controlled automatic operation mode. In this case, as shown in FIG. 6, the whole field of the program set to be viewed/recorded in the timer/controlled automatic operation mode is shaded with a particular color (shaded with diagonal lines in FIG. 6) so that a user can recognize that the whole program is set to be automatically viewed/recorded.

When a user tries to make a registration for timer-controlled viewing/recording for a certain program or a sub-program, if the program or sub-program has overlap in time with another already-set program or sub-program, a warning message 461 is displayed on the EPG table 460 as shown in FIG. 7. This makes it possible to prevent two or more programs or sub-programs from being registered at the same start time by a user.

In the example described above with reference to FIGS. 4 and 5, the user (viewer) has made a registration for timer-controlled recording/viewing of sub-program "sports" of "program 41" in channel CH104. In this case, the user is allowed to view another program (for example, "drama 51" in channel CH105 or "movie 61" in channel CH106) until sub-program "sports" in "program 41" starts.

Figure 8:
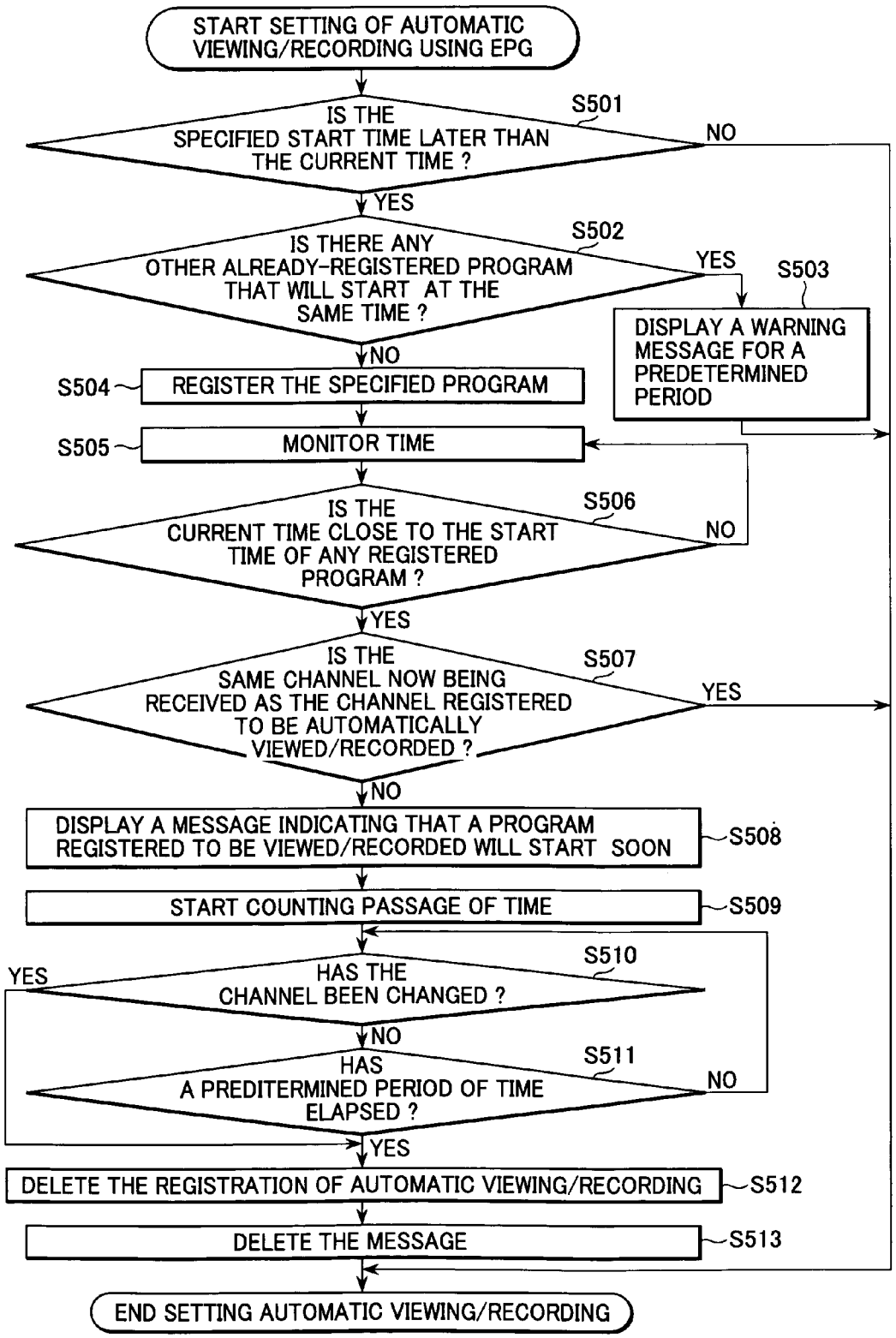
FIG. 8 is a flowchart showing a process performed by the television receiver.

FIG. 8 is a flow chart of a process performed by the CPU 209 when a user issues a command to make a registration for timer-controlled viewing/recording of a particular program/sub-program. Note that the process described herein is not limited to a case in which registration of viewing/recording is performed for a sub-program in a program in the EPG table, but registration for a whole program including all sub-programs can be made in a similar manner. Thus, in the following description the term "program" or "title" can be replaced with "sub-program" or "sub-title".

Step S501. If a user selects a desired program to be registered for timer-controlled viewing/recording, on the EPG table such as that shown in FIG. 4 or 5, the CPU 209 determines whether the start time of the selected program is later than the current time. If and only if it is determined that the start time of the selected program is later than the current time, the process proceeds to step S502. However, if it is determined that the start time of the selected program is not later than the current time (that is, if the start time of the selected program has already passed away), the process is ended.

Step S502. In the case in which it is determined in step S501 that the start time of the program selected by the user is later than the current time, the CPU 209 determines whether the start time of the selected program is equal to the start time of any other program that has already been registered. If such a program is detected, the process proceeds to step S503. However, the process proceeds to step S504, no such program is detected.

Step S503. In the case in which an already-registered program with the same start time as that of the program selected by the user is detected in step S502, the CPU 209 displays a warning message on the EPG table as shown in FIG. 7 to inform the user that another program that will start at the same time has already been registered.

Thereafter, the process is ended.

Step S504. In the case in which it is determined in step S502 that the start time of the selected program is not equal to the start time of any already registered program, the CPU 209 makes registration of the specified program and temporarily stores information associated with the program (information indicating the start time, channel number, etc. of the program) in an internal memory of the CPU 209. The CPU 209 then modifies the EPG table such that the user can recognize that the program selected by the user has been registered. More specifically, in the case in which the whole program including all sub-programs is registered, the CPU 209 shades the whole field of the program with a particular color (in FIG. 6). On the other hand, in the case in which a sub-program of a particular program is registered, the CPU 209 switched the status of the box, indicating whether the program is selected or not, from an open form into a solid form, and the CPU 209 also switches the status of the star mark indicating that sub-program information is available from an open form into a solid form (FIG. 4).

Steps S505 and S506. The CPU 209 monitors the passage of time to detect the arrival of the start time of the registered program. If the CPU 209 detects that the registered program will start soon, the CPU 209 advances the process to step S507.

Step S507. The CPU 209 determines whether the channel number of a program currently being displayed on the display 219 is equal to the channel number of the registered program. If it is determined that the channel numbers are equal, the process is ended. However, if they are not equal to each other, the process proceeds to step S508.

Steps S508 and S509. In the case in which it is determined in step S507 that the channel number of the program being displayed on the display 219 is not equal to that of the registered program, the CPU 209 displays a message 611 on the screen 610 as shown in FIG. 9 to inform the user that the registered program will start soon (step S508), and the CPU 209 starts counting the period of time during which the message is displayed (step S509).

Step S510. The CPU 209 determines whether the channel has been switched by the user to the channel of the registered program or sub-program. If switching of the channel is not detected, the process proceeds to step S511. However, the process proceeds to step S512, if switching of the channel is detected.

Step S511. In the case in which it is determined in step S510 that the channel number of the program being displayed is not switched by the user (viewer), the CPU 209 determines whether a predetermined period of time has elapsed since the displaying of the message was started in step S508. If it is determined that the predetermined period has not elapsed yet, the process returns to step S510 to repeat the operation from step S510. However, if it is determined that the predetermined period has elapsed, the process proceeds to step S512.

Steps S512 and S513. The CPU 209 deletes information associated with registration of the program from the internal memory of the CPU 209 (step S512), and the CPU 209 deletes the message 611 indicating that the registered program will start soon such as that shown in FIG. 9 (step S513). Thereafter, the process is ended.

In the present embodiment of the invention, as described above, when a program includes a plurality of sub-programs, registration for timer-controlled viewing/recording is possible in units of sub-programs in addition to in units of programs.

Second Embodiment

In the first embodiment described above, the broadcast apparatus 100 transmits program information and sub-program information necessary to produce an EPG table together with video data and audio data, and the television receiver 200 produces the EPG table on the basis of program information received from the broadcast apparatus 100 such that sub-program information associated with sub-programs of programs is reflected in the EPG table if sub-program information is provided by the broadcast apparatus 100, thereby making it possible to make a registration in terms of timer-controlled automatic viewing/recording in units of programs or sub-programs. However, in the EPG table, if a certain program includes a very large number of sub-programs, titles of all sub-programs cannot be displayed in a limited field of that program.

In the present embodiment, to avoid such a problem in the EPG table, when a program includes so many sub-programs that titles of all sub-programs cannot be displayed, the field of the program is automatically expanded by changing the full-scale value in the time direction of the EPG table such that all titles of sub-programs can be displayed in the expanded field.

The construction and the operation of the television receiver 200 according to the present embodiment are described below.

The description given herein is focused on parts and operations that are different from those of the first embodiment.

On the basis of program information and sub-program information received from the broadcast apparatus 100, the CPU 209 produces an EPG table in which channels are represented in the X direction and time is represented in the Y direction as shown in FIG. 2. In the present embodiment, the full-scale of time (in the Y direction) of the EPG table can be set to an arbitrary value, such as 1 hour, 2 hours, 6 hours, or 24 hours, specified by the user.

When the full-scale of time (in the Y direction) of the EPG table is set to 6 hours in accordance with designation by a user, if the user selects to display sub-program information associated with a program, titles of sub-programs in the program are displayed in the field of that program. However, if all titles of sub-programs in the program cannot be displayed in the field in the EPG table with the full-scale value of 6 hours, the full-scale value of time (in the Y direction) is changed to, for example, 1 hour that allows all titles of sub-programs to be displayed.

Figure 10:
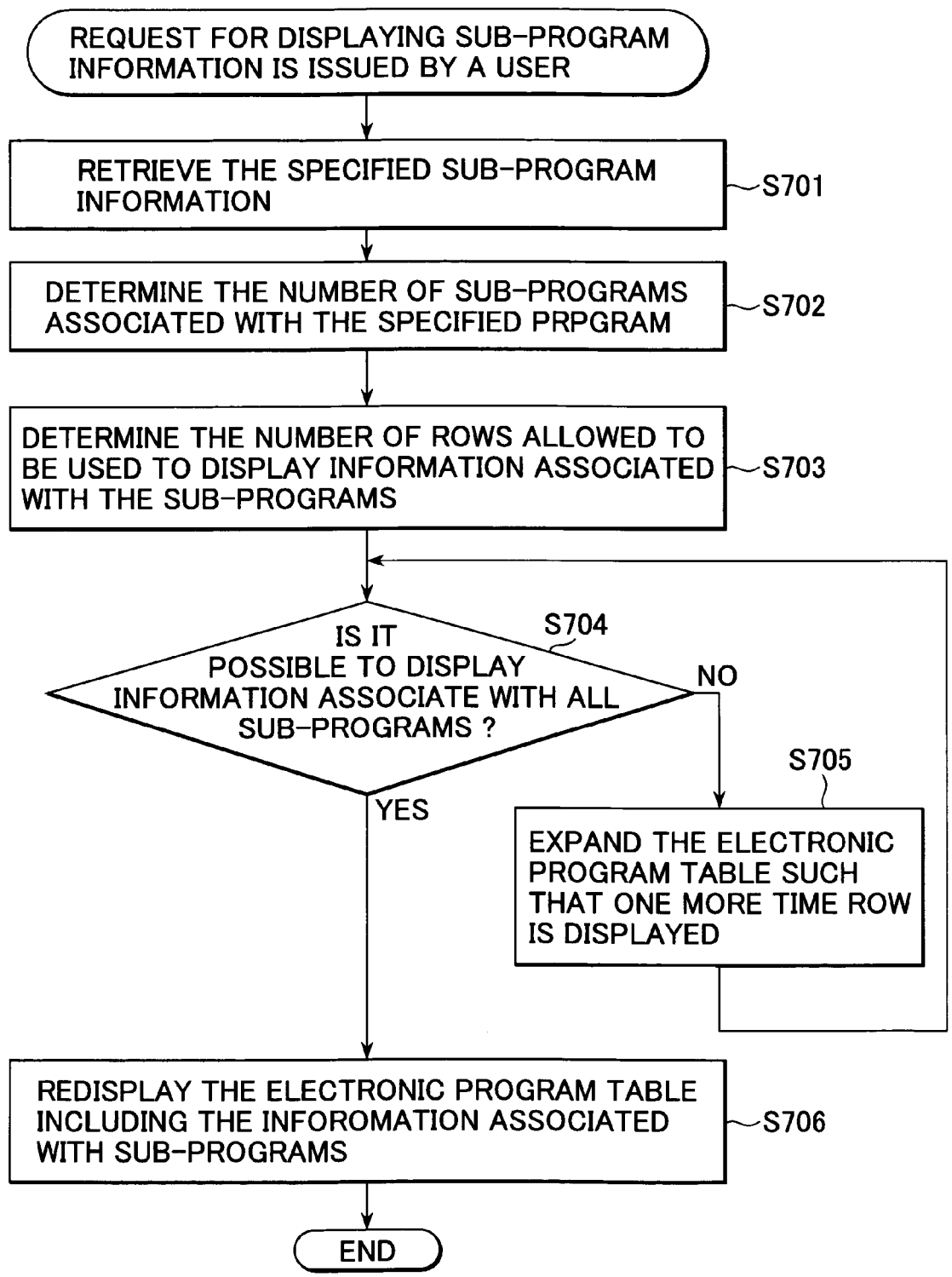
FIG. 10 is a flowchart showing a process performed by a television receiver according to a second embodiment of the present invention.

FIG. 10 is a flow chart of a process performed by the CPU 209 to implement the function described above. Note that the process described herein is not limited to a case in which registration of timer-controlled automatic viewing/recording is performed for a sub-program of a program on the EPG table, but registration for a whole program including all sub-programs can also be performed in a similar manner. Thus, in the following description the term "program" or "title" can be replaced with "sub-program" or "sub-title".

Step S701. If a user selects to display sub-program information by clicking a star mark indicating that sub-program information is available with the cursor and then pressing the enter key or by pressing the special button on the remote control 215 for selecting whether titles of sub-programs are displayed or not, the CPU 209 retrieves sub-program information associated with the specified program from the sub-program information (included in the broadcast data transmitted from the broadcast apparatus 100) temporarily stored in the internal memory of the CPU 209.

Step S702. The CPU 209 extracts the number of sub-programs indicated by the sub-program information acquired in step S701.

Step S703. The CPU 209 determines the number of rows available to display titles of sub-programs in the field of the specified program in the EPG table being displayed.

Step S704. From the number of programs extracted in step S702 and the available number of rows determined in step S703, the CPU 209 determines whether all titles of sub-programs in the program can be displayed in the field. If it is determined that all titles of sub-programs can be displayed, the process proceeds to step S706, otherwise the process proceeds to step S705.

Step S705. In the case in which it is determined in step S704 that all titles of sub-programs in the specified program cannot be displayed, the CPU 209 expands the field by changing the full-scale value of time of the EPG table by one unit. Thereafter, the CPU 209 returns the process to step S704 to determine whether all titles of sub-programs in the specified program can be displayed. The full-scale of time of the EPG table is adjusted by performing steps S705 and 704 repeatedly until it becomes possible to display all titles of sub-programs in the specified program.

Step S706. If it is determined in step S704 that it becomes possible to display all titles of sub-programs in the specified program, the CPU 209 redisplays the EPG table such that all titles of sub-programs in the specified program are displayed. Thereafter, the process is ended.

FIG. 11 shows an example of switching of the state in which the EPG table is displayed on the screen of the display, performed in steps shown in FIG. 10. In the EPG table 810, the full-scale value of time is set to 6 hours. In this state, if a user issues a command to display sub-program information associated with "program 41" in channel CH104 (as represented by 811 in FIG. 11), it is determined that all titles of sub-programs of "program 41" cannot be displayed in the EPG table with the full-scale of 6 hours (step S704 in FIG. 10). The CPU 209 changes the full-scale value in the time axis to 2 hours (step S705 in FIG. 10). As a result, the EPG table 810 is changed as shown as EPG table 810' in FIG. 11. In the EPG table 810', all titles of sub-programs in "program 41" can be displayed in a field 811' of "program 41".

In the present embodiment, as described above, when a user selects to display titles of sub-programs in a particular program, if all titles of sub-programs cannot be displayed in a field of the program in the EPG table, the full-scale value in the time direction of the EPG table is automatically changed such that all titles of sub-programs can be displayed. Thus, the user can view all titles of sub-programs even when a desired program includes a very large number of sub-programs.

Third Embodiment

In the first embodiment described above, the broadcast apparatus 100 transmits program information and sub-program information necessary to produce an EPG table together with video data and audio data, the television receiver 200 produces the EPG table on the basis of program information received from the broadcast apparatus 100 such that sub-program information associated with sub-programs of programs is reflected in the EPG table if sub-program information is provided by the broadcast apparatus 100 thereby making it possible to make a registration in terms of timer-controlled automatic viewing/recording in units of programs or sub-programs. Furthermore, in the first embodiment described above, when it comes close to the start time of a registered program or sub-program to be viewed/recorded, if a channel currently being received and displayed by the television receiver 200 is different from the channel of the registered program or the sub-program that will start soon, a message is displayed on the screen to inform the user that the registered program or sub-program will start soon.

However, after making a registration for timer-controlled automatic viewing/recording of a program or a sub-program, if the power of the television receiver 200 is turned off before the registered program or sub-program starts, it becomes impossible to display a message when it comes close to the start time of the registered program or sub-program, although it is necessary to inform the user that the registered program or sub-program will start soon.

Figure 12:
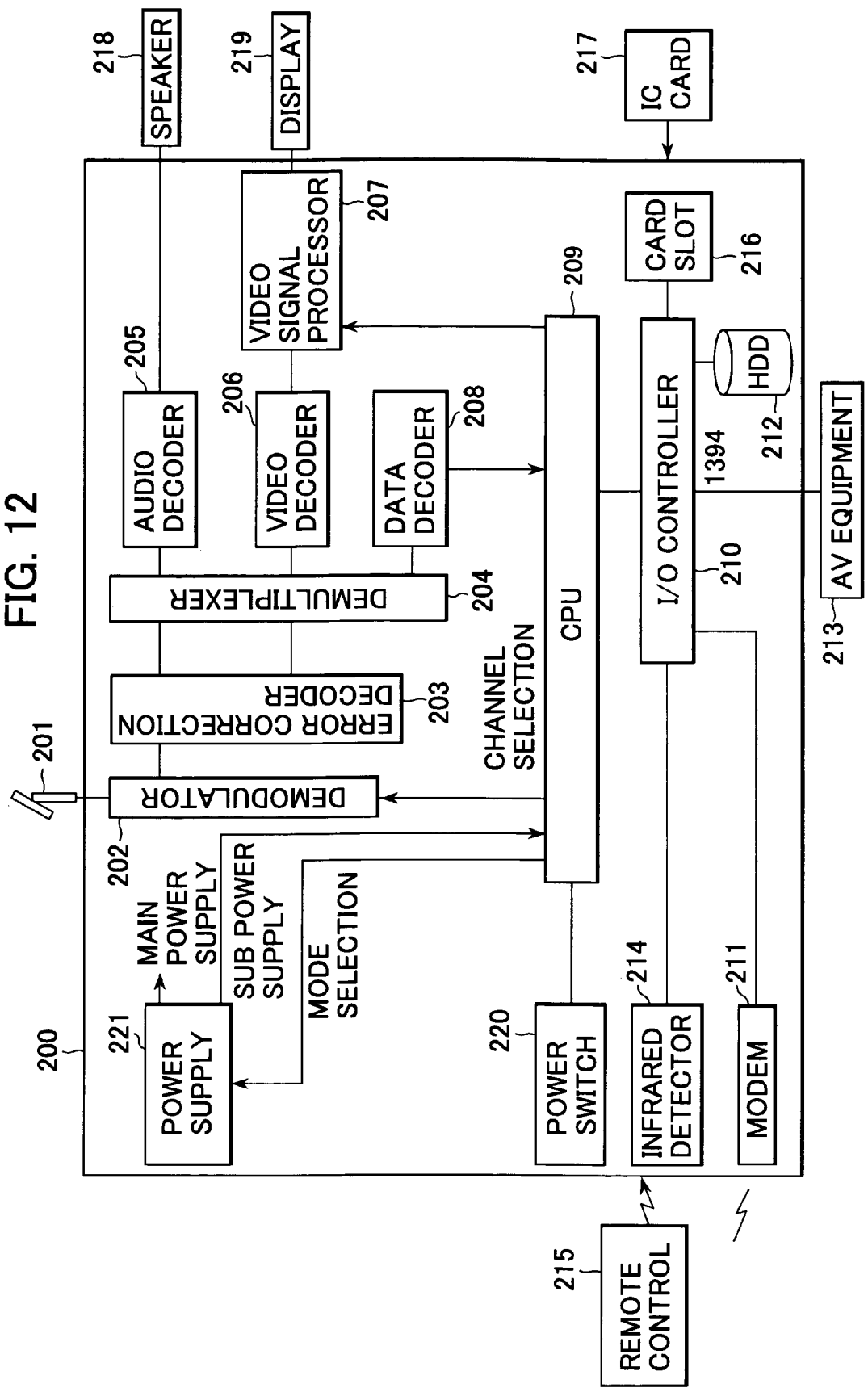
FIG. 12 is a block diagram showing a construction of a television receiver according to a third embodiment of the present invention.

In the third embodiment, to avoid the above problem, as shown in FIG. 12, the television receiver 200 has a power supply 221 that is switched between a first and second operation modes such that in the first operation mode, electric power is supplied over the entire television receiver 200, while in the second operation mode, electric power is supplied only to a part (i.e., CPU 209) that monitors the passage of time to detect the arrival of the start time of a program or a sub-program registered for viewing/recording. The switching between the first and second operation modes of the power supply 221 is performed under the control of the CPU 209.

In this third embodiment, after a user makes a registration for timer-controlled automatic viewing/recording of a program or a sub-program, if a user turns off the power of the television receiver 200 before the registered program or sub-program starts, the CPU 209 of the television receiver 200 switches the operation mode of the power supply 221 to the second operation mode such that supplying of power to the means of monitoring the arrival of the start time of the registered program or sub-program is maintained. If the monitoring means detects that it has come close to the start time of the registered program or sub-program, the operation mode of the power supply 221 is switched to the first operation mode thereby supplying power over the entire television receiver 200, and a message is displayed to inform the user that the registered program or sub-program will start soon.

The construction and the operation of the television receiver 200 according to the present embodiment are described below. The description given herein is focused on parts and operations that are different from those of the first embodiment.

The television receiver 200 according to the present embodiment includes, in addition to those used in the first embodiment, a power switch 220 and a power supply 221.

The power switch 220 is operated by a user (viewer) to turn on/off the power of the television receiver 200. The operation of the power switch 220 is monitored by the CPU 209.

The power supply 221 serves to supply electric power to the television receiver 200. The power supply 221 includes a main power supply that supplies electric power over the entire television receiver 200 in the first operation mode, and also includes a sub power supply that supplies, in the second operation mode, electric power only to the CPU 209 such that the CPU 209 can monitor the arrival of the start time of the registered program or sub-program. The main power supply and the sub power supply turn on/off in response to a mode selection signal supplied via a control signal line from the CPU 209.

Figure 13:
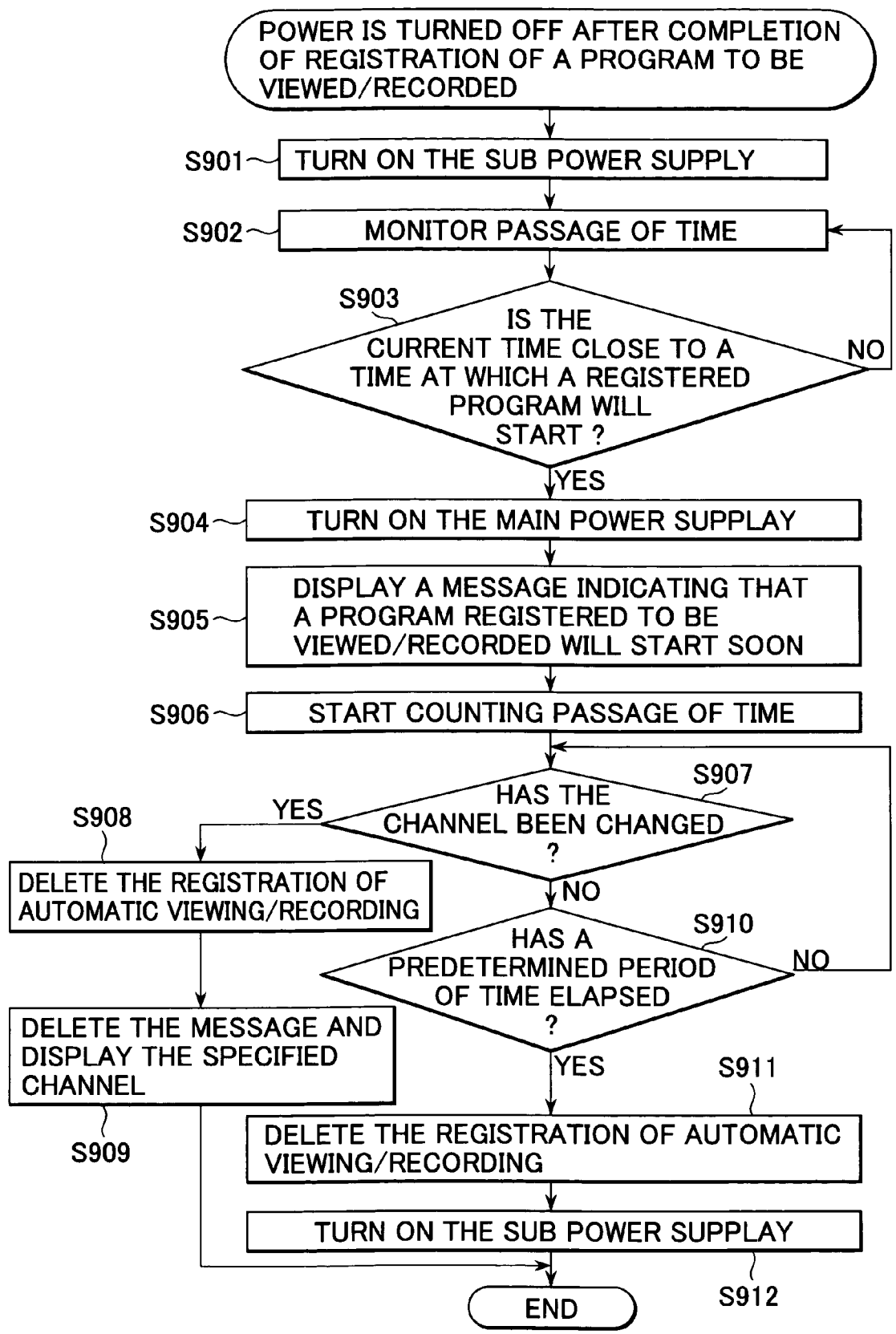
FIG. 13 is a flowchart showing a process performed by the television receiver in response to a command to register a program/sub-program to be viewed/recorded in a timer-control automatic operation mode.

FIG. 13 is a flow chart of a process performed by the CPU 209 to implement the function described above. Note that the process described herein is not limited to a case in which registration of timer-controlled automatic viewing/recording is performed for a sub-program of a program on the EPG table, but registration for a whole program including all sub-programs can also be performed in a similar manner. Thus, in the following description the term "program" or "title" can be replaced with "sub-program" or "sub-title".

Step 901. After a user makes registration for timer-controlled automatic viewing/recording of a program, the user turns off the power switch 220 of the television receiver 200 before the registered program starts. If the CPU 209 detects that the power switch 220 is turned off, the CPU 209 controls the power supply 221 to activate the sub power supply (such that the power supply 221 operates in the second operation mode).

Steps S902 and S903. If the power supply 221 is switched in step S901 into the second operation mode, power is not supplied to all parts of the television receiver 200, and nothing is displayed on the display 219. However, power is supplied from the sub power supply of the power supply 221 to the CPU 209 to make it possible to continue monitoring arrival of the start time of the registered program.

Step S904. If the CPU 209 detects that it has come close to the start time of the registered program, the CPU 209 controls the power supply 221 to activate the main power supply (such that the power supply 221 operates in the first operation mode).

Steps S905 and S906. As a result of switching, in step S904, into the first operation mode, the electric power is supplied over the entire television receiver 200, and the display 219 is also activated.

The CPU 209 displays a message on the display 219 to inform the user that the registered program will start soon (step S905), and the CPU 209 starts counting the period of time during which the message is displayed (step S906).

Step S907. The CPU 209 determines whether the channel is switched to that of the registered program by the user using, for example, the remote control 215. If switching of the channel is not detected, the process proceeds to step S910. However, if switching of the channel is detected, the process proceeds to step S908.

Steps S908 and S909. In the case in which it is determined in step S907 that the channel has been switched, the CPU 209 deletes information associated with registration for timer-controlled automatic viewing/recording of the program from the internal memory of the CPU 209 (step S908), and the CPU 209 deletes the message indicating that the registered program will start soon (step S909). Thereafter, the process is ended.

Step S910. In the case in which switching of the channel is not detected in step S907, the CPU 209 determines whether a predetermined period of time has elapsed since the displaying of the message was started in step S905. If it is determined that the predetermined period has not elapsed yet, the process returns to step S907 to repeat the operation from step S907. However, if it is determined that the predetermined period has elapsed, the process proceeds to step S911.

Steps S911 and S912. In the case in which it is determined in step S910 that the predetermined period of time has elapsed since the displaying of the message was started, the CPU 209 deletes information associated with registration of timer-controlled viewing/recording of the program from the internal memory of the CPU 209 (step S911), and the CPU 209 controls the power supply 221 to activate the sub power supply (step S912). Thereafter, the process is ended. As a result, the power supply 221 is switched into the state in which electric power is not supplied to all parts of the television receiver 200.

In the present embodiment, as described above, even if, after a user makes registration for viewing/recording of a program, the user turns off the power of the television receiver 200 before the registered program starts,-the means of monitoring the arrival of the start time of the registered program still works. If the means detects that it has come close to the start time of the registered program, the power supply of the television receiver 200 is automatically turned on, and a message is displayed to inform the user that the registered program will start soon. This ensures that the user can view the registered program without missing it.

Fourth Embodiment

In the first embodiment described above, the broadcast apparatus 100 transmits program information and sub-program information necessary to produce an EPG table together with video data and audio data, the television receiver 200 produces the EPG table on the basis of program information received from the broadcast apparatus 100 such that sub-program information associated with sub-programs of programs is reflected in the EPG table if sub-program information is provided by the broadcast apparatus 100, thereby making it possible to make a registration in terms of timer-controlled automatic viewing/recording in units of programs or in units of sub-programs. Furthermore, in the first embodiment described above, when time comes close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon.

However, because the message indicating that the registered program will start soon is deleted after it has been displayed for the predetermined period, there is a possibility that the user misses the message, which can cause the user to miss the registered program.

In the fourth embodiment, to avoid the above problem, when it has come close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon, and furthermore the channel is forcedly switched to that of the registered program or sub-program. This ensures that the user can view the registered program even if the user misses the message indicating that the registered program will start soon.

The construction and the operation of the television receiver 200 according to the present embodiment are described below. The description given herein is focused on parts and operations that are different from those of the first embodiment.

Figure 14:
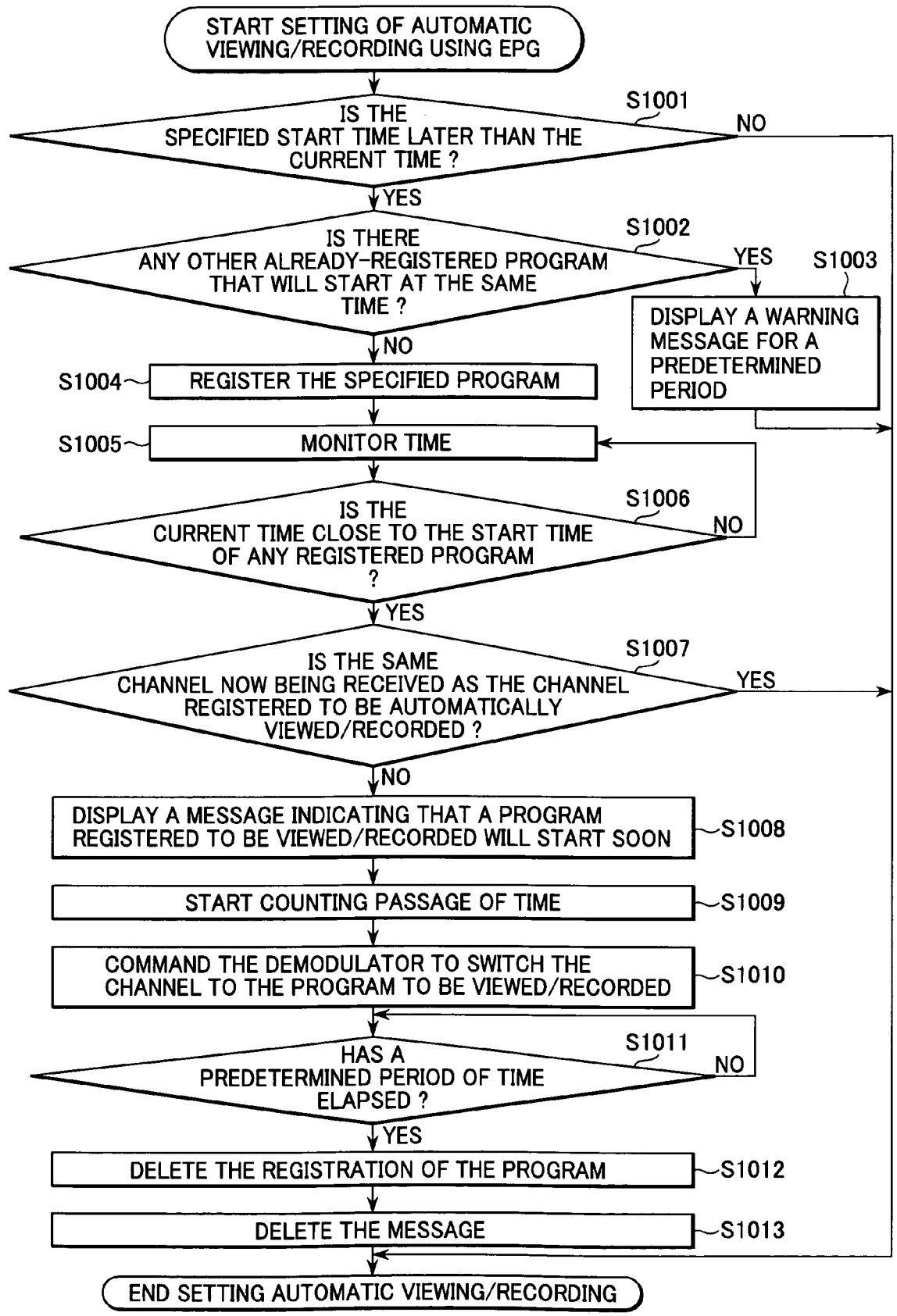
FIG. 14 is a flowchart showing a process performed in response to a command to register a program/sub-program to be viewed/recorded in a timer-control automatic operation mode, according to a fourth embodiment of the present invention.

FIG. 14 is a flow chart of a process performed by the CPU 209 of the television receiver 200 according to the present embodiment when a user issues a command to make a registration for viewing/recording a particular program/sub-program.

Note that, as in the first embodiment, the process described herein is not limited to a case in which registration of timer-controlled automatic viewing/recording is performed for a sub-program of a program on the EPG table, but registration for a whole program including all sub-programs can be performed in a similar manner. Thus, in the following description the term "program" or "title" can be replaced with "sub-program" or "sub-title". The process, from a step (S1001) in which a user makes a registration for timer-controlled automatic viewing/recording of a particular program using an EPG table to a step (S1009) in which a message is displayed on the screen when it has come close to the start time of the registered program to inform the user that the registered program will start soon, is performed in a similar manner to steps S501 to S509 in the first embodiment.

Step S1001. If a user selects, on the EPG table, a desired program to be registered for timer-controlled automatic viewing/recording, the CPU 209 determines whether the start time of the program selected by the user is later than the present time. If and only if it is determined that the start time of the selected program is later than the current time, the process proceeds to step S1002. However, if it is determined that the start time of the selected program is not later than the current time (that is, if the start time of the selected program has already passed away), the process is ended.

Step S1002. In the case in which it is determined in step S1001 that the start time of the program selected by the user is later than the present time, the CPU 209 determines whether the start time of the selected program is equal to the start time of any other program that has already been registered. If such a program is detected, the process proceeds to step S1003. However, if no such program is detected, the program proceeds to step S1004.

Step S1003. In the case in which an already-registered program with the same start time as that of the present program selected by.the user is detected in step S1002, the CPU 209 displays a warning message on the EPG table to inform the user that another program that will start at the same time has already been registered. Thereafter, the process is ended.

Step S1004. In the case in which it is determined in step S1002 that there is no already-registered program with the same start time as that of the present program specified to be registered, the CPU 209 makes registration of the specified program and temporarily stores information associated with the program (information indicating the start time, channel number, etc. of the program) in an internal memory of the CPU 209. The CPU 209 then modifies the EPG table such that the user can recognize that the program selected by the user has been registered.

Steps S1005 and S1006. The CPU 209 monitors the passage of time to detect the arrival of the start time of the registered program. If the CPU 209 detects that the registered program will start soon, the CPU 209 advances the process to step S1007.

Step S1007. The CPU 209 determines whether the channel number of a program currently being displayed on the display 219 is equal to the channel number of the registered program. If it is determined that the channel numbers are equal, the process is ended. However, if they are not equal to each other, the process proceeds to step S1008.

Steps S1008 and S1009. In the case in which it is determined in step S1007 that the channel number of the program currently being displayed on the display 219 is not equal to that of the registered program, the CPU 209 displays a message 611 on the screen 610 to inform the user that the registered program will start soon (step S1008), and the CPU 209 starts counting the period of time during which the message is displayed (step S1009). Step S1010 and following steps, performed after completion of the above-described process, are different from the first embodiment.

Step S1010. The CPU 209 controls the demodulator 202 such that, of frequencies of broadcast radiowaves transmitted from the broadcast apparatus 100, the frequency of the program registered for viewing is demodulated.

Step S1011. The CPU 209 determines whether the predetermined period has elapsed after starting displaying of the message indicating that the registered program will start soon. If it is determined that the predetermined period has elapsed, the process proceeds to step S1012.

Steps S1012 and S1013. The CPU 209 deletes information associated with registration of timer-controlled automatic viewing/recording of the program from the internal memory of the CPU 209 (step S1012), and the CPU 209 deletes the message indicating that the registered program will start soon (step S1013). Thereafter, the process is ended.

In the present embodiment, as described above, when it has come close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon, the channel being received and displayed is switched to that of the registered program or sub-program, thereby ensuring that the user can view the registered program even if the user misses the message indicating that the registered program will start soon.

Fifth Embodiment

In the fourth embodiment described above, the channel of the program currently being viewed is forcedly switched to the channel of a registered program, thereby ensuring that the user can view the registered program even if the user misses the message indicating that the registered program will start soon.

However, when it has come close to the start time of the registered program, if the channel of the program currently being viewed is forcedly switched to the channel of a registered program, the forced switching may be against the desire of the user for further viewing the current program.

In the fifth embodiment, to avoid the above problem, when it has come close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon, and the registered program is displayed in a sub-screen overlaid on the screen on which the current program is being displayed. This makes it possible for the user to view the registered program while further viewing the current program.

The construction and the operation of the television receiver 200 according to the present embodiment are described below. The description given herein is focused on parts and operations that are different from those of the first and fourth embodiments.

Figure 15:
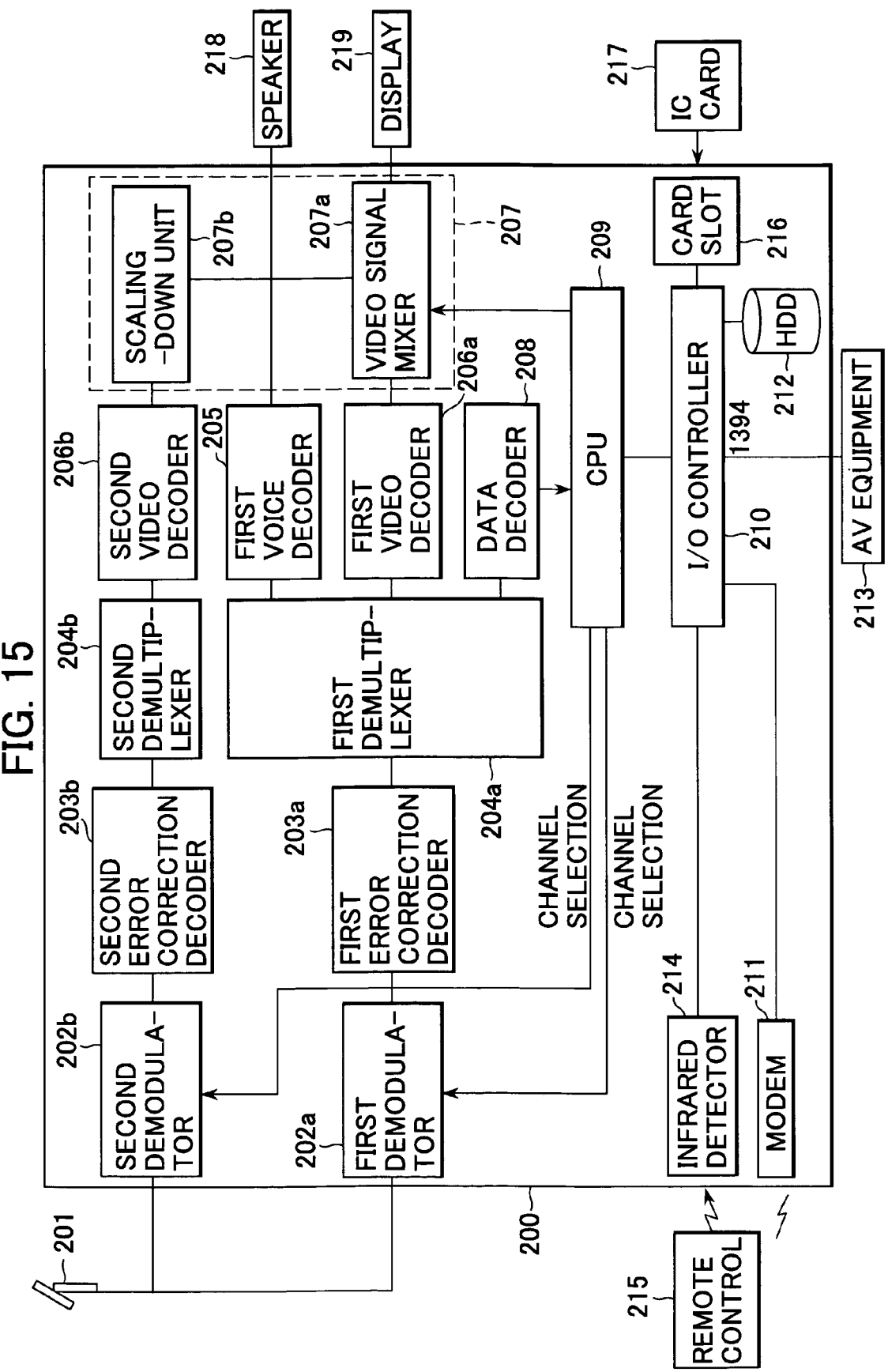
FIG. 15 is a block diagram showing a construction of a television receiver according to a fifth embodiment of the present invention.

FIG. 15 shows the construction of the television receiver 200 according to the present embodiment. In the television receiver 200 according to the present embodiment, as shown in FIG. 15, the demodulator 202, the error correction decoder 203, the demultiplexer 204, and the video decoder 206 in the first embodiment shown in FIG. 1 are respectively replaced with first and second demodulators 202a and 202b, first and second error correction decoders 203a and 203b, first and second demultiplexers 204a and 204b, and first and second video decoders 206a and 206b. Furthermore, in the television receiver 200 according to the present embodiment, the video signal processor 207 is modified so as to include a video signal mixer 207a and a scaling-down unit 207b.

The first demodulator 202a, the first error correction decoder 203a, the first demultiplexer 204a, and the first video decoder 206a provide functions similar to those of the demodulator 202, the error correction decoder 203, the demultiplexer 204, and the video decoder 206, respectively.

On the other hand, the second demodulator 202b, the second error correction decoder 203b, the second demultiplexer 204b, the second video decoder 206b, and the scaling-down unit 207b are used to produce a video signal to be displayed in the sub-screen.

More specifically, the second demodulator 202b demodulates the signal of the channel of the program that is set, in accordance with designation from the user, to be viewed/recorded in the timer-controlled automatic viewing/recording mode and that is included in the broadcast radiowaves received by the receiving antenna 201, independently of the main program (the program currently being displayed on the main screen), thereby obtaining the demodulated data (digital broadcast data) of the specified program.

The second error correction decoder 203b extracts error correction information, added by the error correction coder 111 of the broadcast apparatus 100, from the broadcast data supplied from the second demodulator 202b, and the second error correction decoder 203b checks, using the extracted error correction information, whether an error such as a data loss or conversion into a wrong data value has occurred in the demodulated data. If an error is detected, the second error correction decoder 203b corrects the error.

The second demultiplexer 204b separates coded video data from the broadcast data output from the second error correction decoder 203b. The second video decoder 206b decodes the coded video data supplied from the second demultiplexer 204b into original video data and supplies the resultant video data to the scaling-down unit 207b.

The scaling-down unit 207b scales down the video data supplied from the second video decoder 206b. The video signal mixer 207a superimposes the video signal output from the scaling-down unit 207b on the video signal (main video signal) output from the first video decoder 206a such that the video signal output from the scaling-down unit 207b will be displayed in the sub-screen overlaid on the main screen on which the video signal output from the first video decoder 206a will be displayed on the display 219 (or the display disposed on the television receiver 200).

The scaling-down of the video signal performed by the scaling-down unit 207b may be based on a known technique such as partial discarding of pixels depending on the specified scaling-down factor. As for audio data and associated data such as program information or sub-program information, main audio data and associated data demultiplexed by the first demultiplexer 204a are used.

Figure 16:
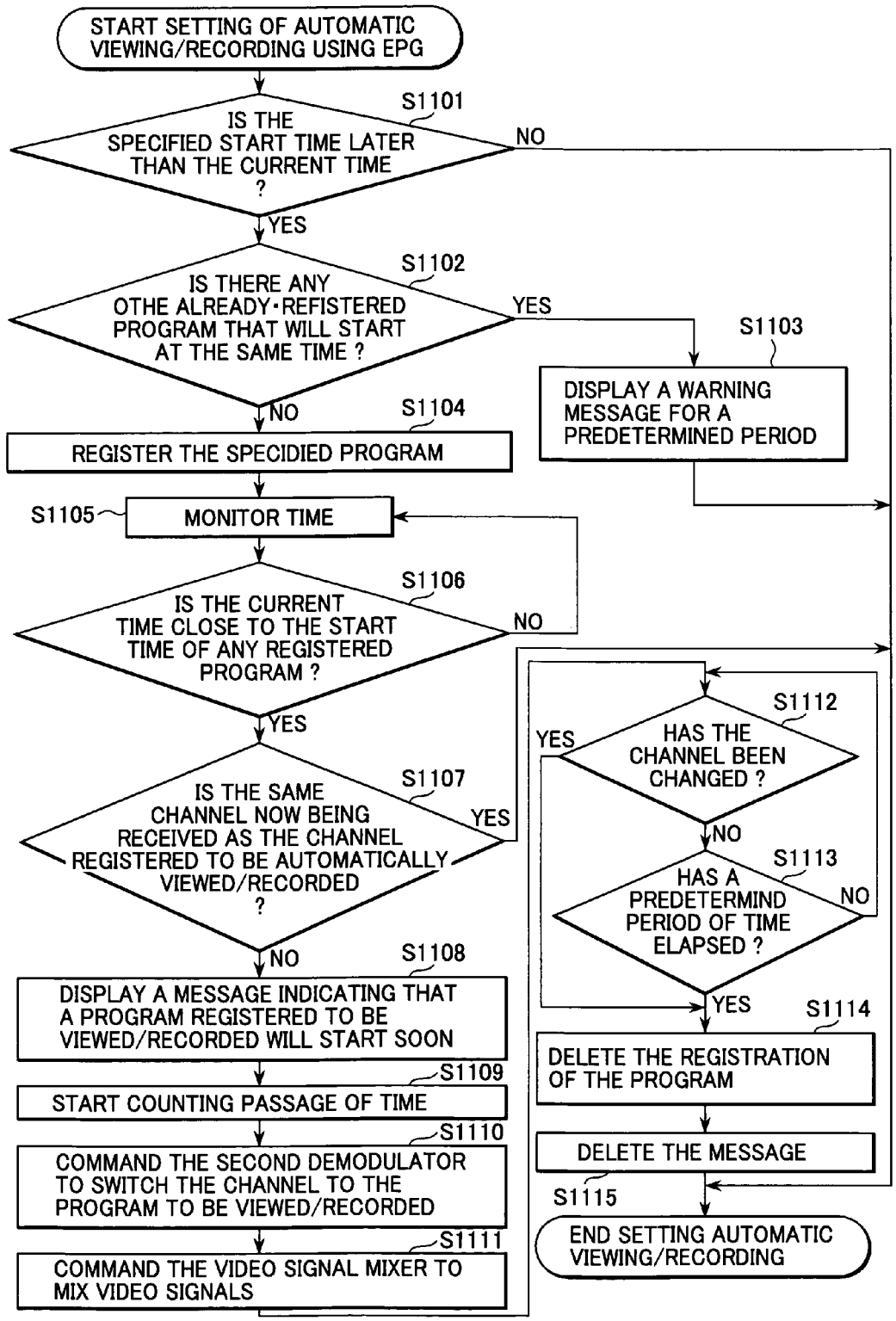
FIG. 16 is a flowchart showing a process performed by the television receiver shown in FIG. 15.

FIG. 16 is a flow chart of a process performed by the CPU 209 of the television receiver 200 shown in FIG. 15 when a user issues a command to make a registration for timer-controlled automatic viewing/recording of a particular program/sub-program.

Note that, as in the first embodiment, the process described herein is not limited to a case in which registration for timer-controlled automatic viewing/recording is performed for a sub-program in a program on the EPG table, but registration for a whole program including all sub-programs can also be performed in a similar manner. Thus, in the following description the term "program" or "title" can be replaced with "sub-program" or "sub-title". The process from a step (S1101) in which a user makes a registration for viewing a particular program using an EPG table to a step (S1109) in which a message is displayed on the screen when time has come close to the start time of the registered program to inform the user that the registered program will start soon is performed in a similar manner to steps S501 to S509 in the first embodiment.

Step S1101. If a user selects, on the EPG table, a desired program to be registered for timer-controlled automatic viewing/recording, the CPU 209 determines whether the start time of the program selected by the user is later than the present time. If and only if it is determined that the start time of the selected program is later than the current time, the process proceeds to step S1102. However, if it is determined that the start time of the selected program is not later than the current time (that is, if the start time of the selected program has already passed away), the process is ended.

Step S1102. In the case in which it is determined in step S1101 that the start time of the program selected by the user is later than the present time, the CPU 209 determines whether the start time of the selected program is equal to the start time of any other program that has already been registered. If such a program is detected, the process proceeds to step S1103. However, if no such program is detected, the program proceeds to step S1104.

Step S1103. In the case in which an already-registered program with the same start time as that of the present program selected by the user is detected in step S1102, the CPU 209 displays a warning message on the EPG table to inform the user that another program that will start at the same time has already been registered. Thereafter, the process is ended.

Step S1104. In the case in which it is determined in step S1102 that there is no already-registered program with the same start time as that of the present program specified to be registered, the CPU 209 makes registration of the specified program and temporarily stores information associated with the program (information indicating the start time, channel number, etc. of the program) in an internal memory of the CPU 209. The CPU 209 then modifies the EPG table such that the user can recognize that the program selected by the user has been registered.

Steps S1105 and S1106. The CPU 209 monitors the passage of time to detect the arrival of the start time of the registered program. If the CPU 209 detects that the registered program will start soon, the CPU 209 advances the process to step S1107.

Step S1107. The CPU 209 determines whether the channel number of a program currently being displayed on the display 219 is equal to the channel number of the registered program. If it is determined that the channel numbers are equal, the process is ended. However, if they are not equal to each other, the process proceeds to step S1108.

Steps S1108 and S1109. In the case in which it is determined in step S1107 that the channel number of the program currently being displayed on the display 219 is not equal to that of the registered program, the CPU 209 displays a message 611 on the screen 610 to inform the user that the registered program will start soon (step S1108), and the CPU 209 starts counting the period of time during which the message is displayed (step S1109). Step S1110 and following steps, performed after completion of the above-described process, are different from the first and fourth embodiment.

Step S1110. The CPU 209 controls the second demodulator 202*b* such that, of frequencies of broadcast radiowaves transmitted from the broadcast apparatus 100, the frequency of the program registered for viewing is demodulated.

Step S1111. Concurrently with step S1110, the CPU 209 issues a command to the video signal mixer 207*a* to output composite video data produced by superimposing the scaled-down video data (obtained by scaling-down the video data output from the second video decoder 206*b*) output from the scaling-down unit 207*b* on the video data (main video data) output from the first video decoder 206*a*.

In response to the command received from the CPU 209, the video signal mixer 207*a* superimposes the scaled-down video data (obtained by scaling-down the video data output from the second video decoder 206*b*) output from the scaling-down unit 207*b* on the video data (main video data) output from the first video decoder 206*a*, and the video signal mixer 207*a* outputs the resultant composite video data. The video data (the composite video data) output from the video signal mixer 207*a* is displayed on the display disposed on the television receiver 200 or on the external display 219 connected to the television receiver 200.

Figure 17:
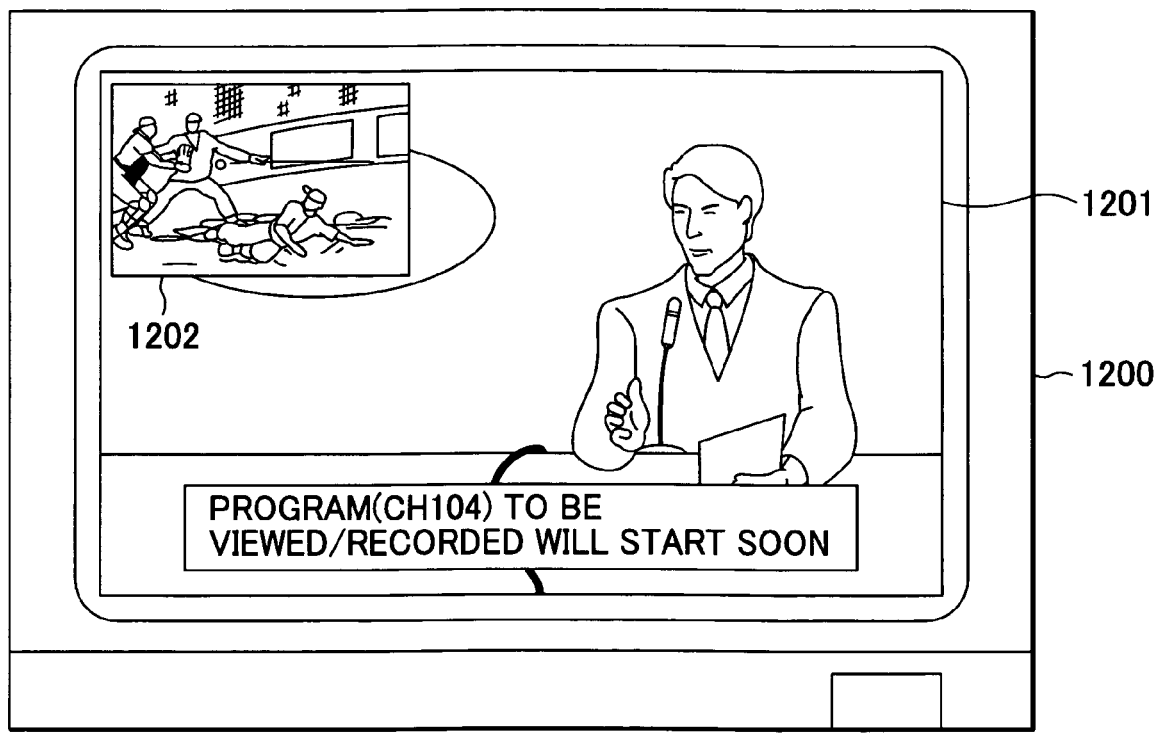
FIG. 17 is a diagram showing an example of a manner in which a program set to be viewed/recorded in the timer-controlled automatic operation mode is displayed on the screen of the display.

FIG. 17 shows an example of a composite image 1200 displayed on the external display 219 or the display disposed on the television receiver 200. In this example of the composite image 1200, as shown in FIG. 17, the program specified to be viewed/recorded in the timer-controlled automatic viewing/recording mode is displayed in the form of a scaled-down image 1202 overlaid on a main image 1201.

Step S1112. The CPU 209 determines whether the channel of the program being displayed is switched by the user to another channel. If switching of the channel is detected, the process proceeds to step S1114. However, the process proceeds to step S1113, if switching of the channel is not detected.

Step S1113. In the case in which it is determined in step S1112 that the channel has been switched, the CPU 209 determines whether the predetermined period has elapsed after starting displaying of the message indicating that the registered program will start soon. If it is determined that the predetermined period has elapsed, the process proceeds to step S1114, but otherwise the process returns to step S1112 to repeat the operation from step S1112.

Steps S1114 and S1115. If it is determined in step S1112 that the channel has been switched or if it is determined in step S1113 that the predetermined period has been elapsed, the CPU 209 deletes information associated with registration of timer-controlled automatic viewing/recording of the program from the internal memory of the CPU 209 (step S1114), and the CPU 209 deletes the message indicating that the registered program will start soon (step S1115). Thereafter, the process is ended.

In the present embodiment, as described above, when it has come close to the start time of a registered program or sub-program, if a channel currently being displayed on the screen is different from the channel of the registered program or the sub-program that will start soon, a message is displayed on the screen to inform the user that the registered program or the sub-program will start soon, and the registered program is displayed in the sub-screen overlaid on the screen on which the current program is being displayed, thereby making it possible for the user to view the registered program while further viewing the current program.

Sixth Embodiment

In the fifth embodiment described above, the broadcast apparatus 100 transmits program information and sub-program information necessary to produce an EPG table together with video data and audio data, the television receiver 200 produces the EPG table on the basis of program information received from the broadcast apparatus 100 such that sub-program information associated with sub-programs of programs is reflected in the EPG table if sub-program information is provided by the broadcast apparatus 100, thereby making it possible to make a registration in terms of timer-controlled automatic viewing/recording in units of programs or in units of sub-programs. Furthermore, in the fifth embodiment described above, when time comes close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon, and the registered program is displayed in the sub-screen overlaid on the screen on which the current program is being displayed, thereby making it possible for the user to view the registered program while further viewing the current program.

In contrast, in the present embodiment, when time comes close to the start time of a program or sub-program to be viewed/recorded in the timer-controlled automatic viewing/recording mode, if a channel currently being displayed on the display is different from the channel of the program or the sub-program to be viewed/recorded in the timer-controlled automatic viewing/recording mode, a message is displayed on the screen to inform the user that the program or the sub-program, specified to be viewed/recorded in the timer-controlled automatic viewing/recording mode, will start soon, and the specified program is displayed in a sub-screen such that the sub-screen is not overlaid on the main screen on which the current program is being displayed.

Figure 18:
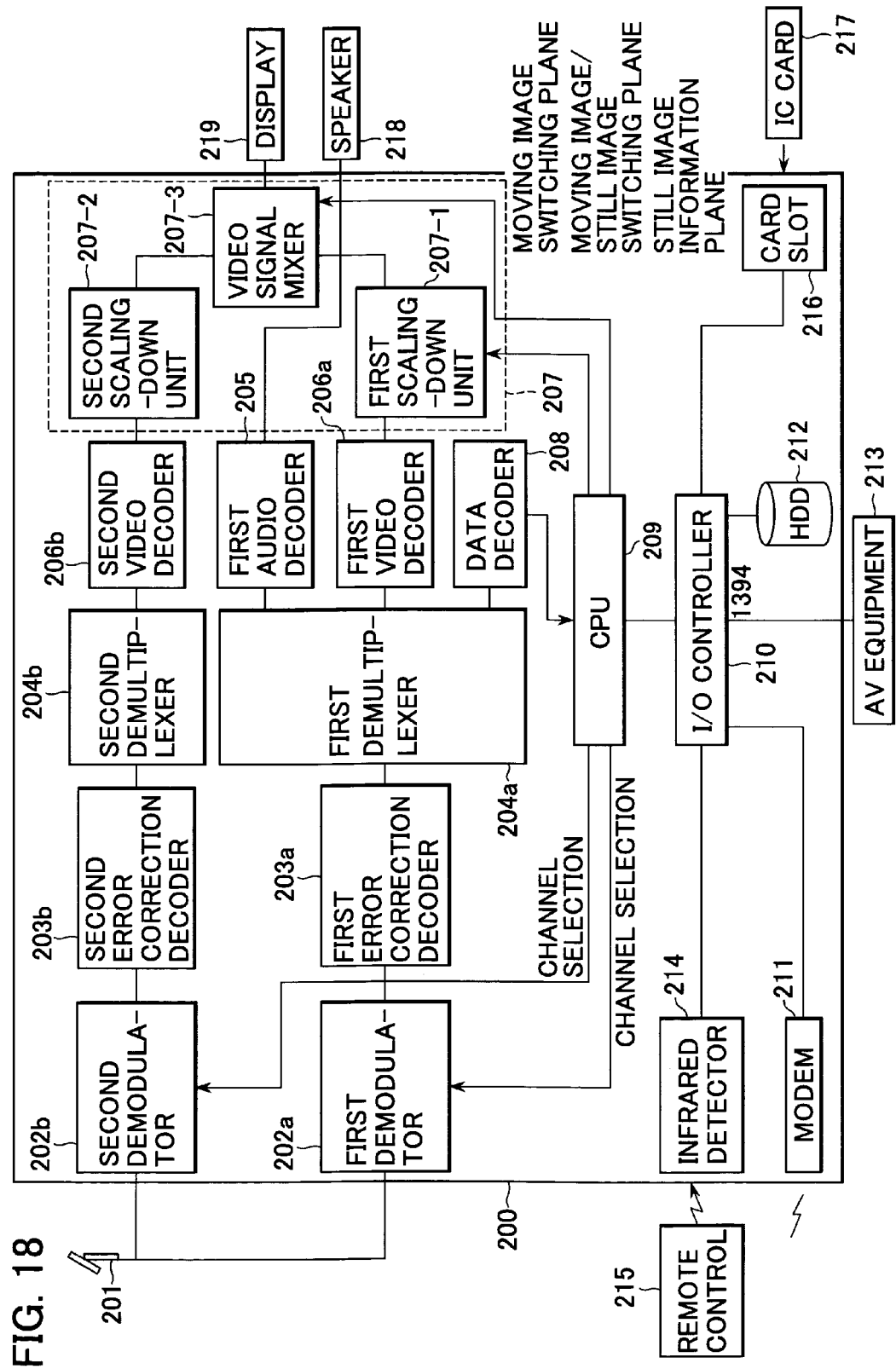
FIG. 18 is a block diagram showing a construction of a television receiver according to a sixth embodiment of the present invention.

In the present embodiment, to achieve the function described above, the television receiver 200 includes, as shown in FIG. 18, a first scaling-down unit 207-1 for scaling down the main video data.

The construction and the operation of the television receiver 200 according to the present embodiment are described below. The description given herein is focused on parts and operations that are different from those of the first and fifth embodiments.

Like the television receiver shown in FIG. 15, the television receiver 200 according to the present embodiment includes, as shown in FIG. 18, first and second demodulators 202a and 202b, first and second error correction decoders 203a and 203b first and second demultiplexers 204a and 204b, and first and second video decoders 206a and 206b, but, the difference from the television receiver shown in FIG. 15 is that a video signal process 207, which is further included in the television receiver 200 according to the present embodiment, includes a first scaling-down unit 207-1 for scaling down the video data output from the first video decoder 206a, a second scaling-down unit 207-2 for scaling down the video data output from the second video decoder 206b, and a video signal mixer 207-3 for mixing video data output from the first scaling-down unit 207-1 and video data output from the second scaling-down unit 207-2.

In the normal state (in which the video image of a program set to be viewed/recorded in the timer-controlled automatic viewing/recording mode is not displayed), the first scaling-down unit 207-1 directly outputs the video data received from the first video decoder 206a without performing any processing on the received video data. However, if the first scaling-down unit 207-1 receives a scale down command from the CPU 209, the first scaling-down unit 207-1 scales down the video data received from the first video decoder 206a and supplies the resultant scaled-down video data to the video signal mixer 207-3 at the following stage.

The scaling-down of the video signal performed by the first scaling-down unit 207-1 and the second scaling-down unit 207-2 may be based on a known technique such as partial discarding of pixels depending on the specified scaling-down factor.

Figure 19:
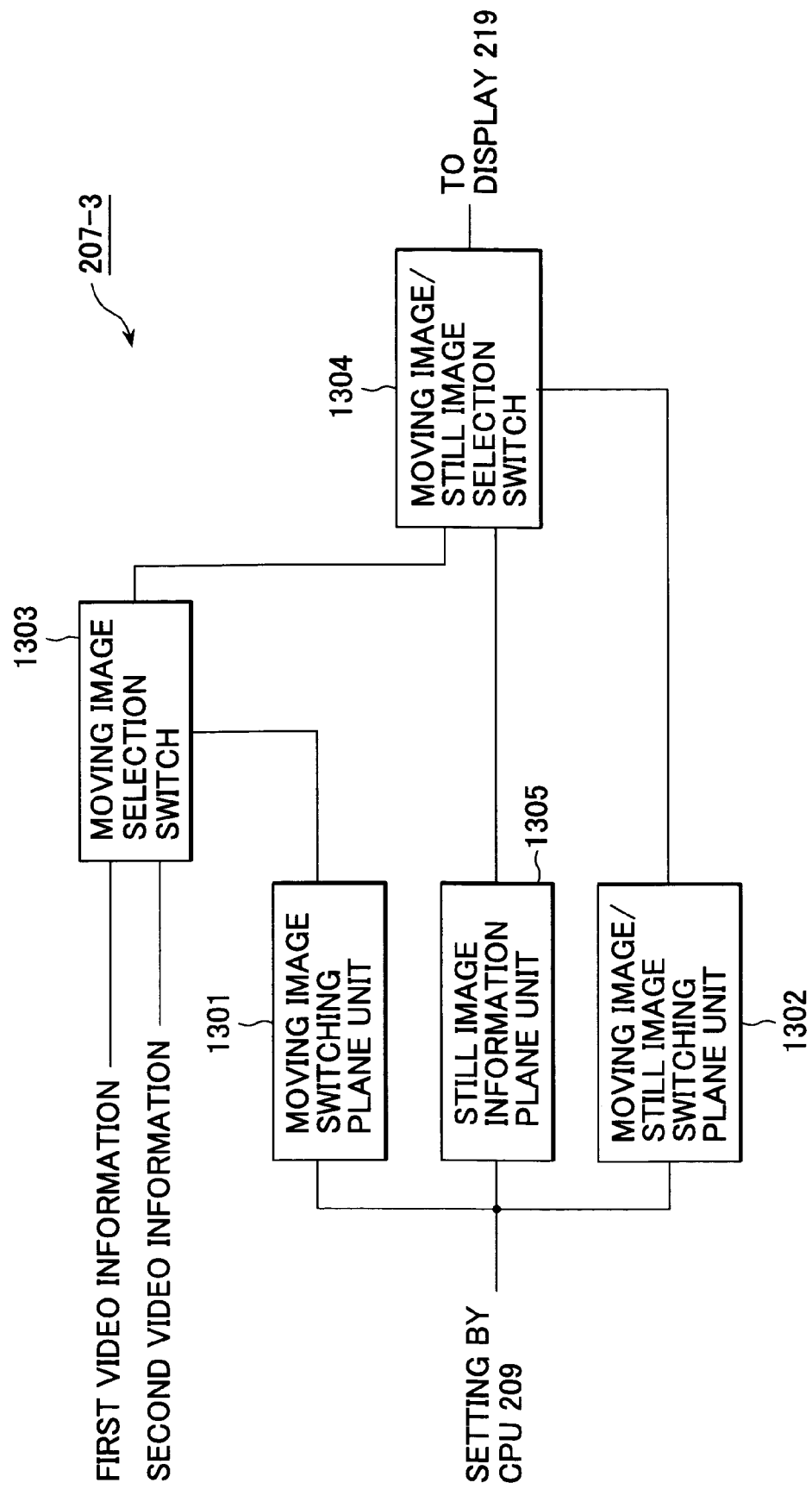
FIG. 19 is a block diagram showing a construction of a video signal mixer in the television receiver.

As shown in FIG. 19, the video signal mixer 207-3 includes a moving image switching plane unit 1301 a moving/still image switching plane unit 1302, a moving image selection switch 1303, a moving/still selection switch 1304, and a still image information plane unit 1305. The video signal mixer 207-3 constructed in the above-described manner mixes video data (first video data) output from the first scaling-down unit 207-1, video data (second video data) output from the second scaling-down unit 207-2, and still image data (produced from program information, sub-program information, and other associated data transmitted from the broadcast apparatus 100 via the satellite 330) output from the CPU 209.

The moving image switching plane unit 1301 stores information indicating which of two video data, the first video data (main video data) output from the first scaling-down unit 207-1 and the second video data (video data of a program set to be viewed/recorded in the timer-controlled automatic viewing/recording mode) output from the second scaling-down unit 207-2, should be output. The moving/still image switching plane unit 1302 stores information indicating which of three data, the first video data (main video data) output from the first scaling-down unit 207-1, the second video data (video data of a program set to be viewed/recorded in the timer-controlled automatic viewing/recording mode) output from the second scaling-down unit 207-2, and still image data (produced from program information, sub-program information, and other associated data transmitted from the broadcast apparatus 100 via the satellite 330) output from the CPU 209 should be output.

Each of the moving image switching plane unit 1301 and the moving/still image switching plane unit 1302 has information storage area corresponding to the display area of the display disposed on the television receiver 200 or the external display 219 connected to the television receiver 200. Herein, 1-bit data is stored in the moving image switching plane unit 1301 and the moving/still image switching plane unit 1302. More specifically, when the information stored therein is "1", one input video data is selected, while when the information stored therein is "0", the other input video data is selected. The 1-bit data stored therein is specified by the CPU 209.

The still image information plane unit 1305 stores still image data. The still image information plane unit 1305 also has information storage area corresponding to the display area of the display disposed on the television receiver 200 or the external display 219 connected to the television receiver 200, and the still image information plane unit 1305 stores, in this information storage area, still image data (produced from program information, sub-program information, and other associated data transmitted from the broadcast apparatus 100 via the satellite 330) output from the CPU 209.

In accordance with the data stored in the moving image switching plane unit 1301, the moving image selection switch 1303 selects one of the main video data output from the first scaling-down unit 207-1 and the video data (specified to be viewed/recorded in the timer-controlled automatic viewing/ recording mode) output from the second scaling-down unit 207-2, and the moving image selection switch 1303 outputs the selected video data. In accordance with the data stored in the moving image/still image switching plane unit 1302, the moving/still selection switch 1304 selects one of the video data selected by the moving image selection switch 1303 and the data (still image data) stored in the still image information plane unit 1305, and the moving/still selection switch 1304 outputs the selected data.

That is, in accordance with the data stored in the moving image switching plane unit 1301 and the moving image/still image switching plane unit 1302, the image of the main program (the first video data) and the image of the program specified to be viewed/recorded in the timer-controlled automatic viewing/recording mode (the second video data) are mixed such that those two data do not have overlapping when they are displayed on the screen, and, furthermore, a still image (such as a message indicating that the program specified to be viewed/recorded in the timer-controlled automatic viewing/recording mode will start soon) output from the CPU 209 is combined with the second video data such that the still image is located in an area that is not used by the second video data.

Figure 20:
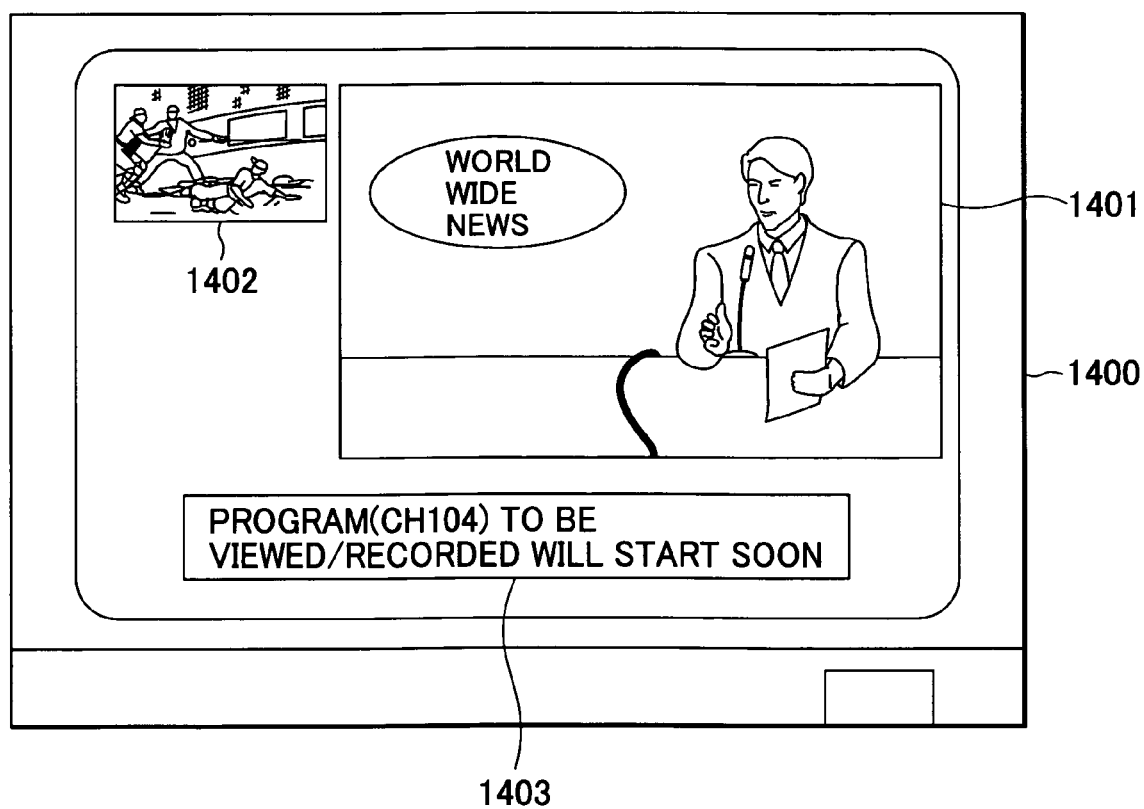
FIG. 20 is a diagram showing another example of a manner in which a program set to be viewed/recorded in the timer-controlled automatic operation mode is displayed on the screen of the display.

FIG. 20 shows an example of the image 1400 displayed in accordance with the resultant composite data. As shown in FIG. 20, the image 1400 includes the image of the main program (the first video data) 1401 and the image 1402 of the program specified to be viewed/recorded in the timer-controlled automatic viewing/recording mode (the second video data), and a message 1403 indicating that the program specified to be viewed/recorded in the timer-controlled automatic viewing/recording mode will start soon, wherein those are displayed such that they do not overlap with each other.

Figure 21:
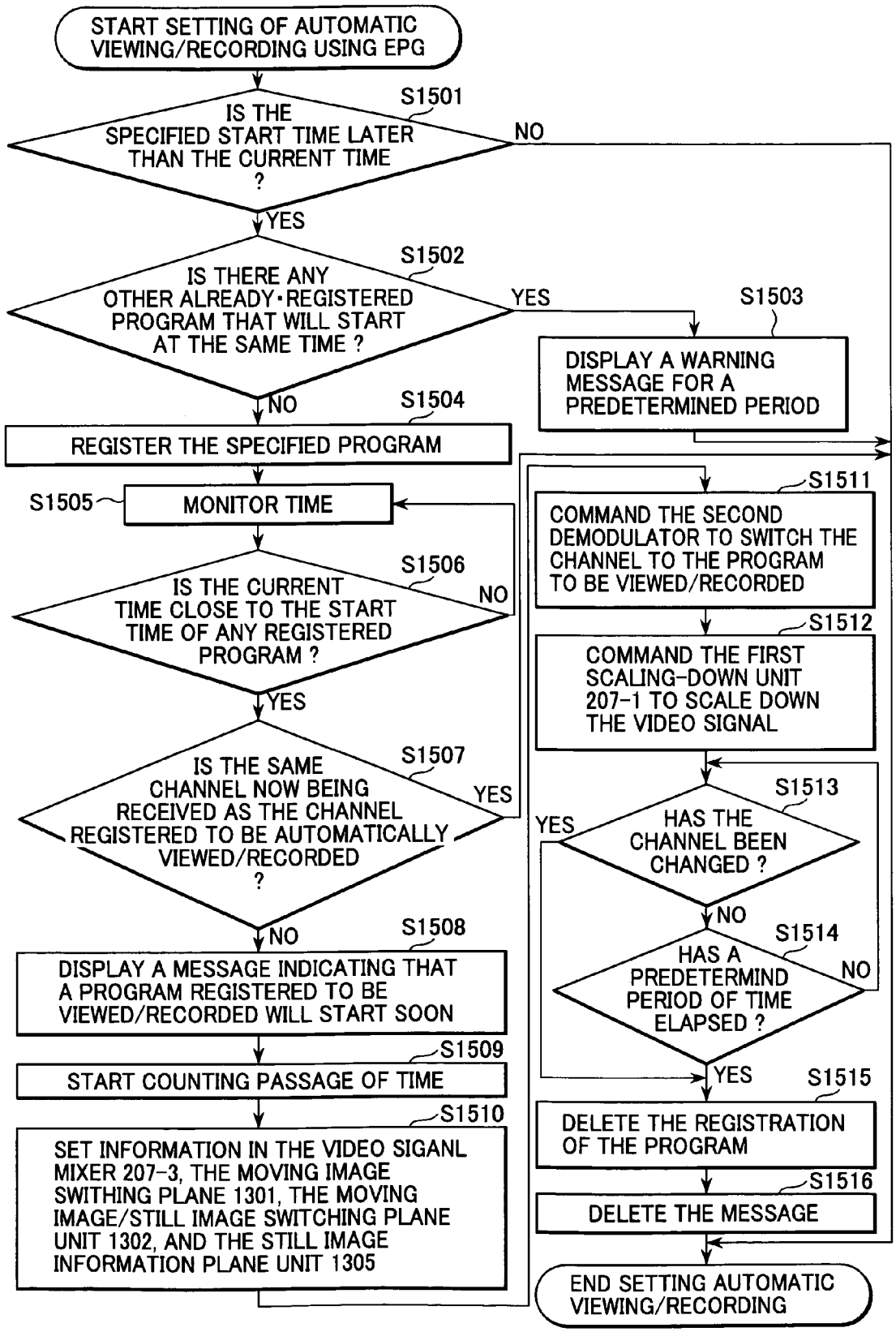
FIG. 21 is a flowchart showing a process performed by the television receiver.

FIG. 21 is a flow chart of a process performed by the CPU 209 of the television receiver 200 shown in FIG. 18 when a user issues a command to make a registration for viewing/recording a particular program/sub-program.

Note that, as in the first embodiment, the process described herein is not limited to a case in which registration for timer-controlled automatic viewing/recording is performed for a sub-program in a program on the EPG table, but registration for a whole program including all sub-programs can also be performed in a similar manner. Thus, in the following description the term "program" or "title" can be replaced with "sub-program" or "sub-title". The process from a step (S1501) in which a user makes a registration for viewing a particular program using an EPG table to a step (S1509) in which a message is displayed on the screen when time has come close to the start time of the registered program to inform the user that the registered program will start soon is performed in a similar manner to steps S501 to S509 in the first embodiment.

Step S1501. If a user selects, on the EPG table, a desired program to be registered for timer-controlled automatic viewing/recording, the CPU 209 determines whether the start time of the program selected by the user is later than the present time. If and only if it is determined that the start time of the selected program is later than the current time, the process proceeds to step S1502. However, if it is determined that the start time of the selected program is not later than the current time (that is, if the start time of the selected program has already passed away), the process is ended.

Step S1502. In the case in which it is determined in step S1501 that the start time of the program selected by the user is later than the present time, the CPU 209 determines whether the start time of the selected program is equal to the start time of any other program that has already been registered. If such a program is detected, the process proceeds to step S1503. However, if no such program is detected, the program proceeds to step S1504.

Step S1503. In the case in which an already-registered program with the same start time as that of the present program selected by the user is detected in step S1502, the CPU 209 displays a warning message on the EPG table to inform the user that another program that will start at the same time has already been registered. Thereafter, the process is ended.

Step S1504. In the case in which it is determined in step S1502 that there is no already-registered program with the same start time as that of the present program specified to be registered, the CPU 209 makes registration of the specified program and temporarily stores information associated with the program (information indicating the start time, channel number, etc. of the program) in an internal memory of the CPU 209. The CPU 209 then modifies the EPG table such that the user can recognize that the program selected by the user has been registered.

Steps S1505 and S1506. The CPU 209 monitors the passage of time to detect the arrival of the start time of the registered program. If the CPU 209 detects that the registered program will start soon, the CPU 209 advances the process to step S1507.

Step S1507. The CPU 209 determines whether the channel number of a program currently being displayed on the display 219 is equal to the channel number of the registered program. If it is determined that the channel numbers are equal, the process is ended. However, if they are not equal to each other, the process proceeds to step S1508.

Steps S1508 and S1509. In the case in which it is determined in step S1507 that the channel number of the program currently being displayed on the display 219 is not equal to that of the registered program, the CPU 209 displays a message 611 on the screen 610 to inform the user that the registered program will start soon (step S1508), and the CPU 209 starts counting the period of time during which the message is displayed (step S1509). Step S1510 and following steps, performed after completion of the above-described process, are different from the first and fifth embodiment.

Step S1510. The CPU 209 stores data indicating which of video data should be selected into the moving image switching plane unit 1301 of the video signal mixer 207-3, data indicating whether video data or still image data should be selected into the moving image/still image switching plane unit 1302, and still image data to be mixed into the still image information plane unit 1305.

Step S1511. The CPU 209 controls the second demodulator 202b such that, of frequencies of broadcast radiowaves transmitted from the broadcast apparatus 100, the frequency of the program registered for viewing is demodulated.

Step S1512. Concurrently with step S1511, the CPU 209 issues a command to the first scaling-down unit 207-1 to scale down the input video data and output the resultant scaled-down video data.

In the video signal mixer 207-3, via steps S1510 to S1512 described above, in accordance with the data stored in the moving image switching plane unit 1301 and the moving image/still image switching plane unit 1302, the image of the main program (the first video data) and the image of the program specified to be viewed/recorded in the timer-controlled automatic viewing/recording mode (the second video data) are mixed such that those two data do not have overlapping when they are displayed on the screen, and, furthermore, a still image (such as a message indicating that the program specified to be viewed/recorded in the timer-controlled automatic viewing/recording mode will start soon) output from the CPU 209 is combined with the second video data such that the still image is located in an area that is not used by the second video data. The resultant composite image is displayed on the display disposed on the television receiver 200 or on the external display 219 connected to the television receiver 200 (FIG. 20).

Step S1513. The CPU 209 determines whether the channel of the program being displayed is switched by the user to the channel of the registered program or sub-program. If switching of the channel is detected, the process proceeds to step S1514. However, the process proceeds to step S1513, if switching of the channel is not detected.

Step S1514. In the case in which it is determined in step S1513 that the channel has been switched, the CPU 209 determines whether the predetermined period has elapsed after starting displaying of the message indicating that the registered program will start soon. If it is determined that the predetermined period has elapsed, the process proceeds to step S1515, but otherwise the process returns to step S1513 to repeat the operation from step S1513.

Steps S1515 and S1516. If it is determined in step S1513 that the channel has been switched or if it is determined in step S1514 that the predetermined period has been elapsed, the CPU 209 deletes information associated with registration of timer-controlled automatic viewing/recording of the program from the internal memory of the CPU 209 (step S1515), and the CPU 209 deletes the message indicating that the registered program will start soon (step S1516). Thereafter, the process is ended.

In the present embodiment, as described above, when it has come close to the start time of a registered program or sub-program, if a channel currently being received and displayed by the television receiver 200 is different from the channel of the registered program or the sub-program that will start soon, a message is displayed on the screen to inform the user that the registered program or the sub-program will start soon, and the registered program is displayed in the sub-screen such that the sub-screen is not overlapped with the main screen on which the current program (the main image) is being displayed, thereby making it possible for the user to view the registered program while further viewing the current program without being partially hidden by the sub screen.

Seventh Embodiment

In the television receiver 200 according to this seventh embodiment, an EPG table is displayed such that sub-programs of programs are colored depending on the genres of the respective sub-programs.

The construction and the operation of the television receiver 200 according to the present embodiment are described below. The description given herein is focused on parts and operations that are different from those of the first embodiment.

Figure 22:
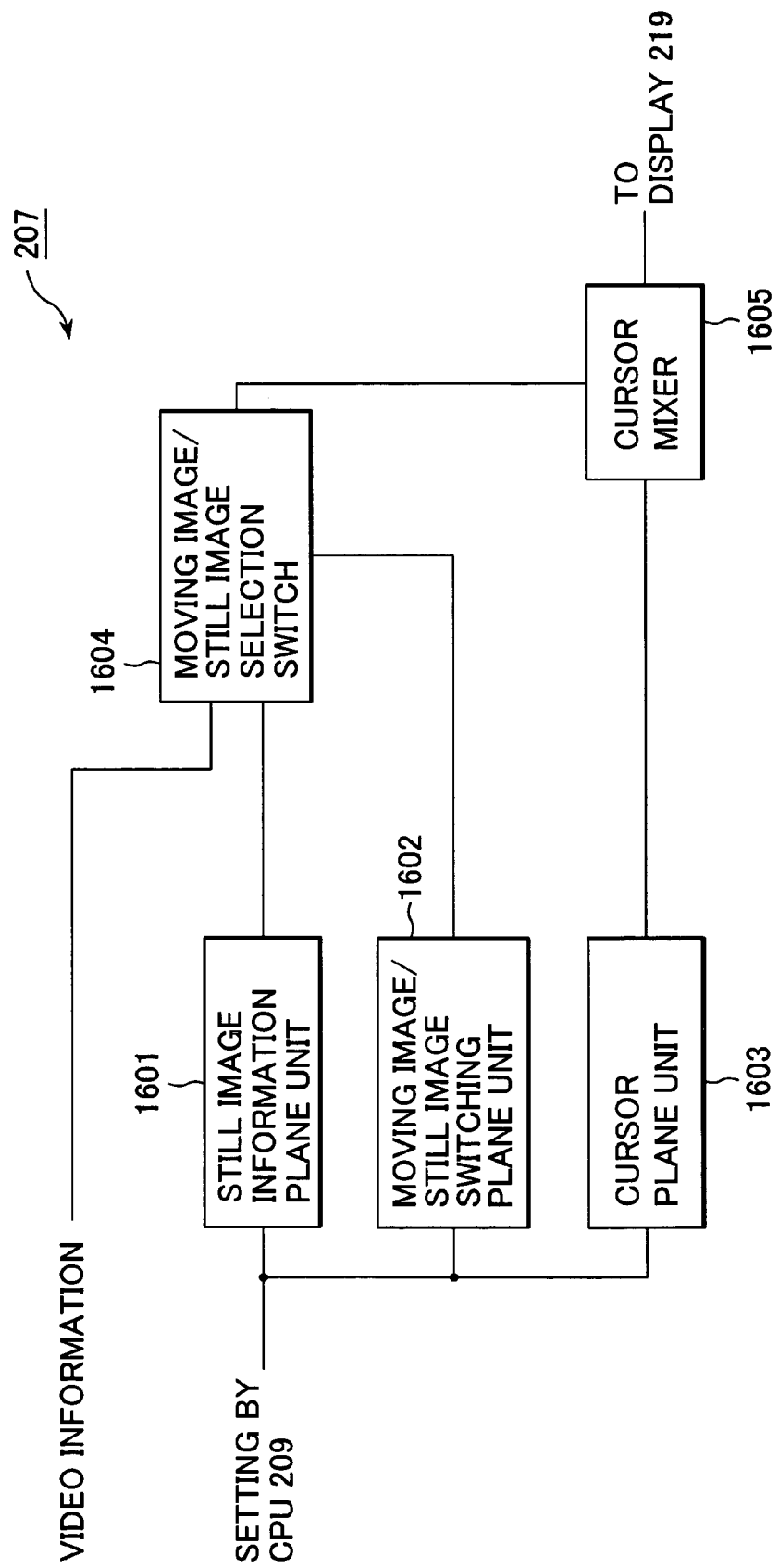
FIG. 22 is a block diagram showing a construction of a video signal processor in a television receiver according to a seventh embodiment of the present invention.

FIG. 22 shows the internal structure of the vide signal processor 207 of the television receiver 200. As shown in FIG. 22, the video signal processor 207 includes a still image information plane unit 1601, a moving/still image switching plane unit 1602, a cursor plane unit 1603, a moving/still selection switch 1604, and a cursor mixer 1605, whereby video data included in broadcast data transmitted from the broadcast apparatus 100 and image data produced by the CPU 209 are combined together.

The still image information plane unit 1601 stores still image data (produced from data including program information and other associated data transmitted from the broadcast apparatus 100 via the satellite 330) output from the CPU 209. The still image information plane unit 1601 has information storage area corresponding to the display area of the display disposed on the television receiver 200 or the external display 219 connected to the television receiver 200.

The moving/still image switching plane unit 1602 stores information indicating which of two data, video data included in broadcast data transmitted from the broadcast apparatus 100 and still image data output from the still image information plane unit 1601, should be selected and output. As with the still image information plane unit 1601, the moving/still image switching plane unit 1602 also has information storage area corresponding to the display area of the display disposed on the television receiver 200 or the external display 219 connected to the television receiver 200.

Herein, 1-bit data is stored in the still image information plane unit 1601, and the moving/still image switching plane unit 1602, wherein, when the information stored therein is "1", one input video data is selected, while when the information stored therein is "0", the other input video data is selected. The 1-bit data stored therein is specified by the CPU 209.

In accordance with the data stored in the moving image/still image switching plane unit 1602, the moving/still selection switch 1604 selects one of video data included in broadcast data transmitted from the broadcast apparatus 100 and the data (still image data) stored in the still image information plane unit 1601, and the moving/still selection switch 1604 outputs the selected data.

The cursor plane unit 1603 stores information indicating the shape and the location of a cursor that is produced by the CPU 209 and that is to be displayed on the screen of the display, for use in selecting desired information on the EPG table. As with the still image information plane unit 1601, the cursor plane unit 1603 also has information storage area corresponding to the display area of the display disposed on the television receiver 200 or the external display 219 connected to the television receiver 200.

The cursor mixer 1605 combines the data stored in the cursor plane unit 1603 and the data output from the moving/still selection switch 1604 and the cursor mixer 1605 outputs the resultant composite data.

The location of the cursor displayed on the display is changed in accordance with the operation of the remote control 215 as will be described later.

Although in the present embodiment, the information indicating the shape and the location of the cursor is stored in the cursor plane unit 1603 having information storage area corresponding to the display area of the display disposed on the television receiver 200 or the external display 219 connected to the television receiver 200, only information indicating the shape of the cursor may be stored in the cursor plane unit 1603, and the cursor mixer 1605 may superimpose the cursor image, at a location specified by the CPU 209, on the video data output from the moving/still selection switch 1604.

Figure 23:
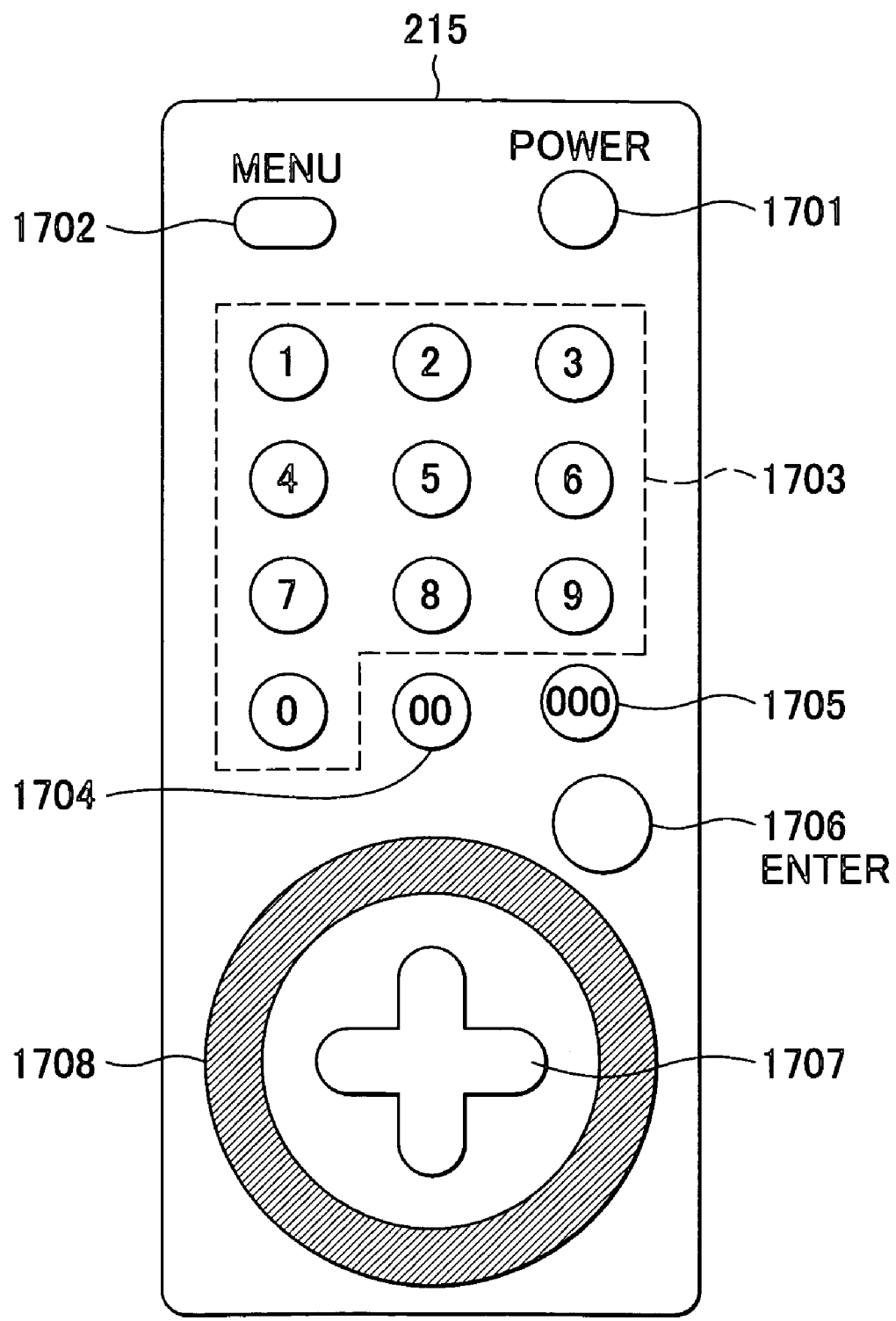
FIG. 23 is a diagram showing a remote control used to control a television receiver.

FIG. 23 shows a remote control 215 capable of communicating with the infrared receiver 214 of the television receiver 200. As shown in FIG. 23, the remote control 215 includes a power switch 1701, a menu button 1702, numeric keys 1703, a 2-digit button 1704, a 3-digit button 1705, an enter button 1706, a cross-shaped button 1707, and a circle button 1708.

The power switch 1701 is used to turn on/off the power of the television receiver 200 and/or the display 219. The menu button 1702 is used to display a menu screen for use in displaying an EPG table or other setting screens such as a screen for adjusting the image quality. Numeric keys 1703 include keys used to input numeric values from 0 to 9.

The 2-digit input button 1704 is used to input a 2-digit numeric value. The 3-digit input button 1705 is used to input a 3-digit numeric value. The enter button 1706 is used to enter information or a numeric value selected by the cursor. If the cross-shaped button 1708 is pressed when the EPG table or the menu is displayed, the item selected on the EPG table or the menu is changed upward, downward, rightward, or leftward. The cross-shaped button 1708 is also used to turn up/down the sound volume or to increment/decrement the channel number. The circle button 1708 is used to move the cursor in a desired direction.

Figure 24:
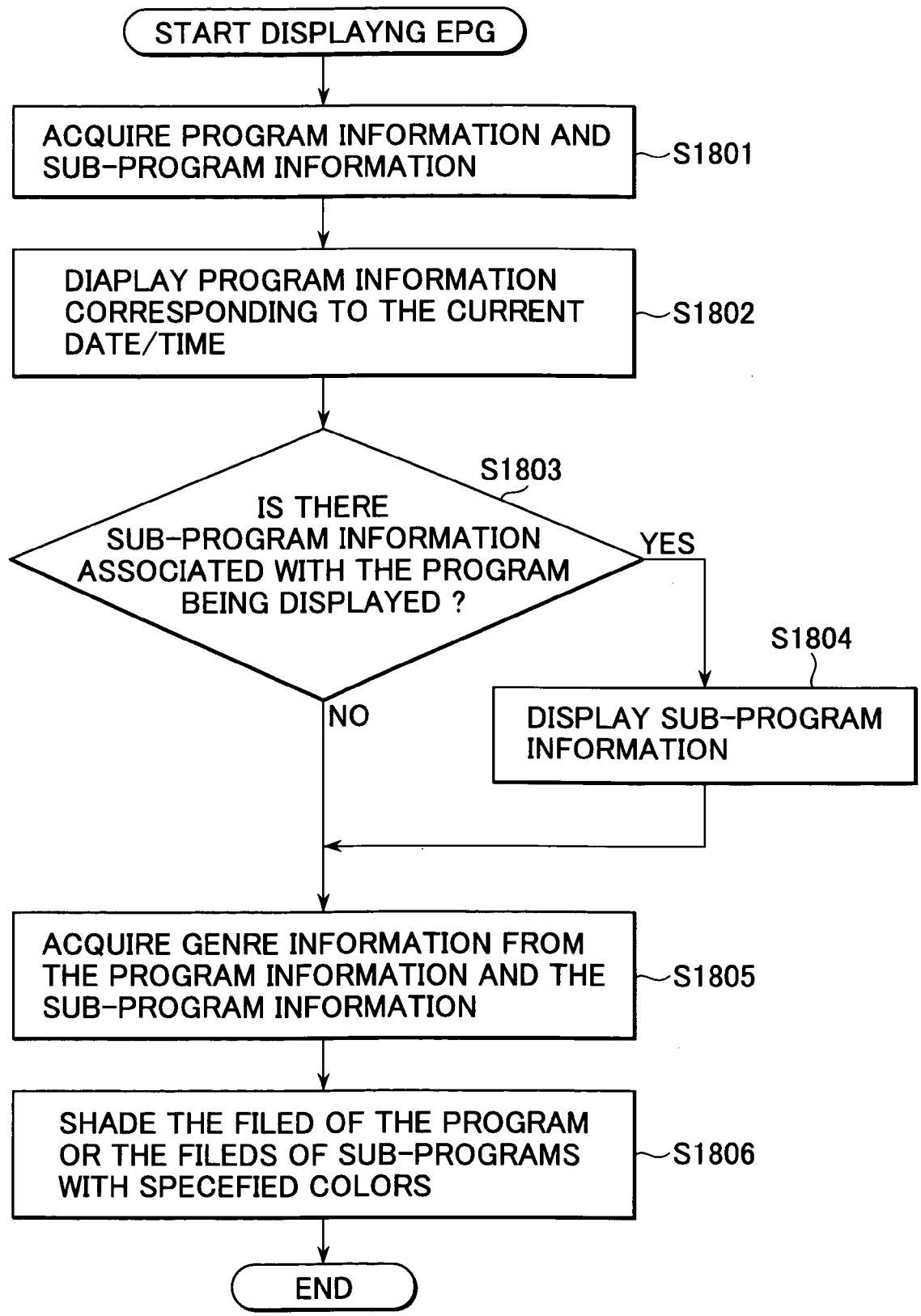
FIG. 24 is a flow chart showing a process of displaying an electronic program guide table, performed by the television receiver.

FIG. 24 is a flow chart showing a process performed in the television receiver 200 to produce an EPG table on the basis of program information and sub-program information included in data transmitted from the broadcast apparatus 100. More specifically, the television receiver 200 produces an EPG table by executing a program on the CPU 209 in accordance with the flow chart shown in FIG. 24 as described below.

Steps S1801 and S1802. The CPU 209 extracts program information and sub-program information to be used in producing an EPG table from the data received from the broadcast apparatus 100 (step S1801). The CPU 209 then produces an EPG table corresponding to the current date/time from the extracted program information and sub-program information and displays the resultant EPG table on the display 219 (or the display disposed on the television receiver 200) (step S1802).

Step S1803. The CPU 209 determines whether there is sub-program information associated with a program in the EPG table produced in step S1802. If there is such sub-program information, the process proceeds to step S1804 and further to S1805. However, if there is no such sub-program information, the process directly proceeds to step S1805.

Step S1804. In the case in which it is determined in step S1803 that there is sub-program information associated with a program in the EPG table, the CPU 209 displays the sub-program information in a field of that program in the EPG table, and the CPU 209 further adds a mark thereto to indicate that sub-program information associated with that program is available.

Steps S1805 and S1806. The CPU 209 extracts genre information from the program information and the sub-program information acquired in step S1801 (step S1805). On the basis of the extracted genre information, the CPU 209 shades fields of respective programs or sub-programs with colors depending on the genre (step S1806). Thereafter, the process is ended.

Figure 25:
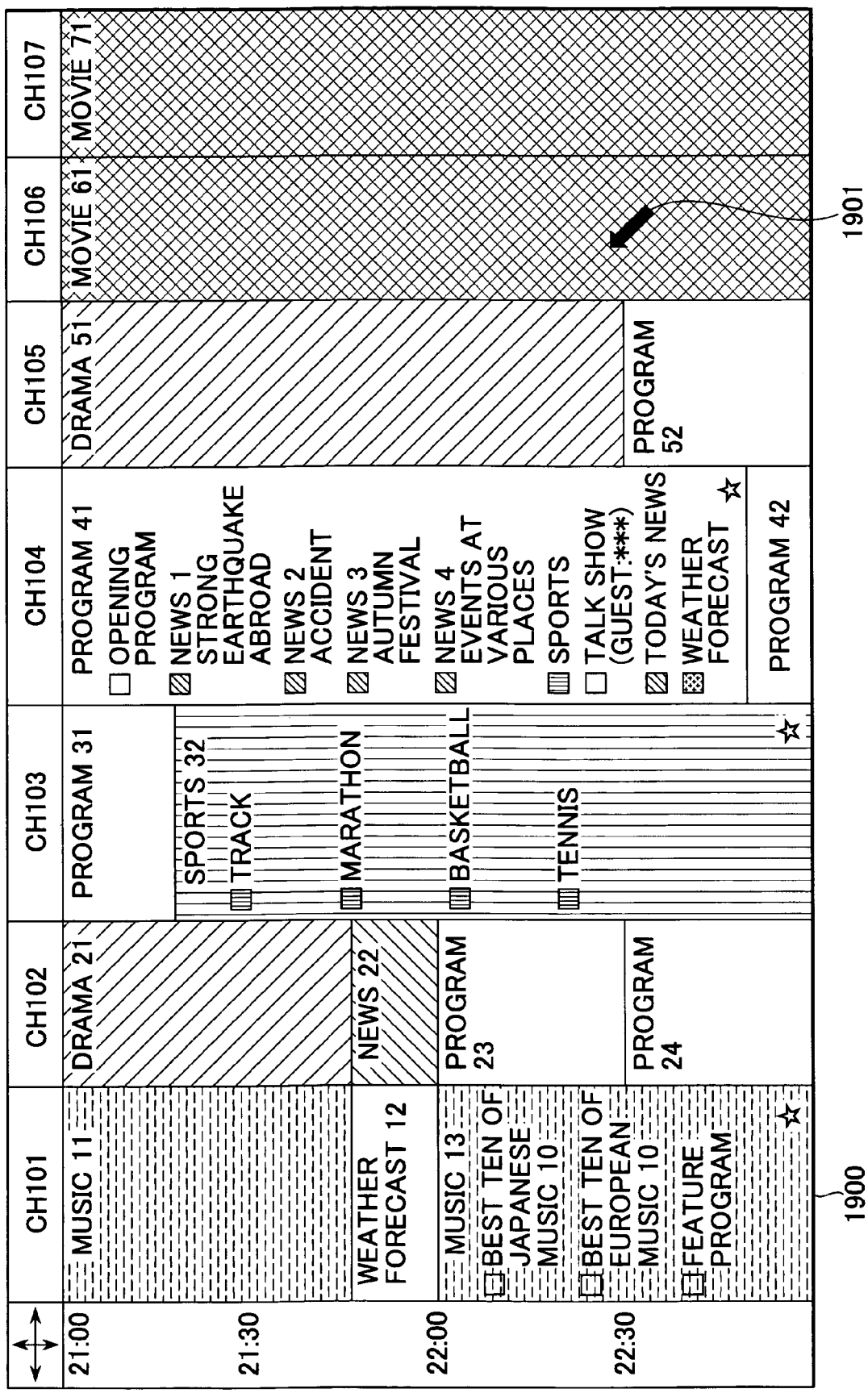
FIG. 25 is a diagram showing an example of an electronic program guide displayed on the screen of the display.

FIG. 25 shows an example of the EPG table 1900 in a state in which programs or sub-programs are colored according to genres via the process shown in FIG. 24. In the EPG table 1900, a program or a sub-program displayed in fields can be selected using the cursor 1901.

More specifically, in a case in which program information or sub-program information includes information indicating genres of programs or sub-programs, program information or sub-program information is expressed with color depending on the genres as shown in FIG. 25. In FIG. 25, for the convenience of illustration, differences in color are expressed by various kinds of shading such as shading with diagonal lines, shading vertical lines, or half-tone dots.

In the EPG table, a star-shaped mark is used to indicate that sub-program information is available, as with "music 13" in channel CH101, sports 32" in channel CH103, and "program 41" in channel CH104. That is, star-shaped marks are added to respective fields of "music 13" in channel CH101, sports 32" in channel CH103, and program 41" in channel CH104 to indicate that sub-program information associated with those programs is available.

In the case of "music 13" in channel CH101 and "sports 32" in channel CH103 each including sub-programs, all sub-programs of "music 13" are of genre of music, and all sub-programs of "sports 32" are of genre of sports, and thus the program "music 13" in channel CH101 is categorized as music and the program "sport 32" in channel CH103 is categorized as sports.

On the other hand, in the case of "program 41" in channel CH104, the program includes different genres of sub-programs such as sports and news, the program as a whole is not categorized but each sub-program is categorized on the basis of genre information included in sub-program information, and marks indicating genres are displayed in front of the respective titles of sub-programs (square-shaped marks colored according to genres are displayed in the example shown in FIG. 25).

Of a large number of pieces of sub-program information transmitted from the broadcast apparatus 100, sub-program information associated with "program 41" in channel CH104 is shown as an example in FIG. 26. As shown in FIG. 26, the sub-program information includes an ID number (program ID) indicating a program to which sub-programs belong, titles of sub-programs included in the program, start times of respective sub-programs, and genres of respective sub-programs.

On the basis of genre information included in sub-program information such as that shown in FIG. 26, the CPU 209 detects the genre of each sub-program included in each program and expresses genres of respective sub-programs using colors corresponding to the respective genres in the EPG table.

The EPG table produced by the CPU 209 in the above-described manner is sent to the video signal processor 207. The video signal processor 207 combines the EPG table with video data supplied from the video decoder 206, and the resultant composite image is displayed on the display disposed on the television receiver 200 or the external display 219 connected to the television receiver 200.

Figure 27:
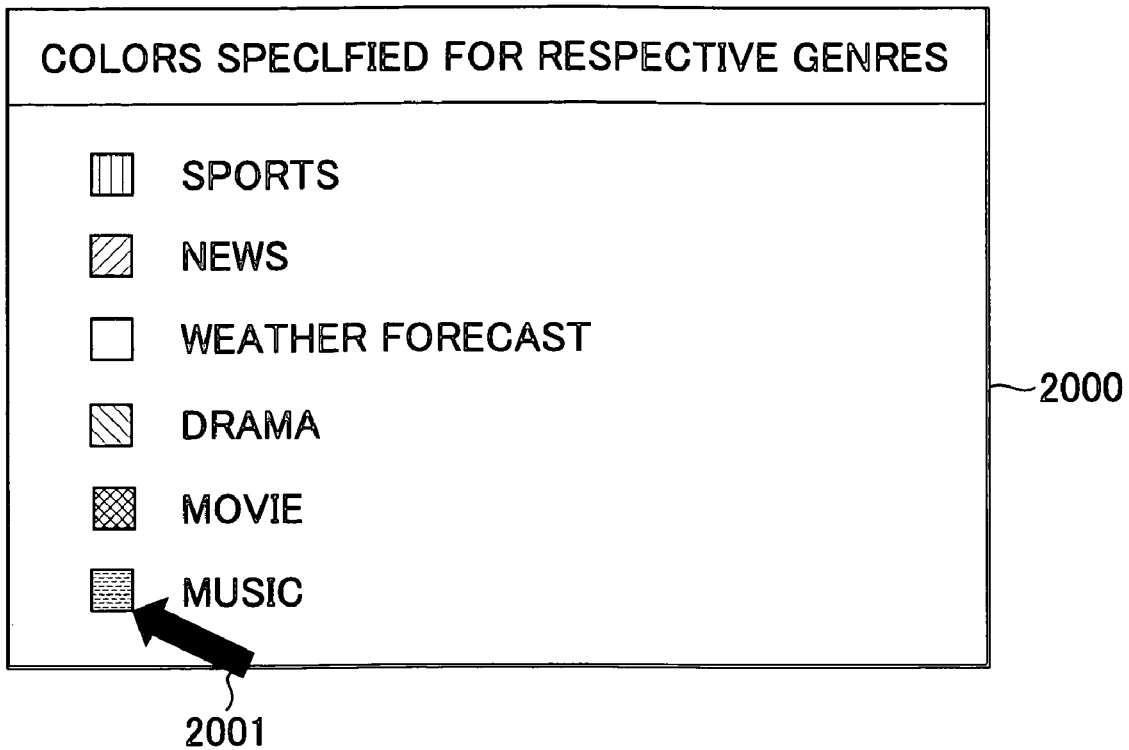
FIG. 27 is a diagram showing an example of a setting screen for use in setting colors indicating respective genres, in the television receiver.

FIG. 27 shows an example of a setting screen 2000 for use in specifying colors corresponding to respective genres. On this setting screen 2000, a user can specify desired colors for respective genres. For example, in response to an operation performed on the setting screen 2000 by a user, the CPU 209 performs setting associated with color.

If the user presses the menu button 1702 on the remote control 215 shown in FIG. 23, a menu appears. In the menu, if color setting is selected, the setting screen 2000 for specifying colors of respective genres is displayed on the display 219 (or the display disposed on the television receiver 200). When the user wants to change a color assigned to a particular genre to another color, the user moves the cursor 2001 onto that genre (square-shape colored mark) on the setting screen 2000 and presses the enter button 1706 on the remote control 215.

Figure 28:
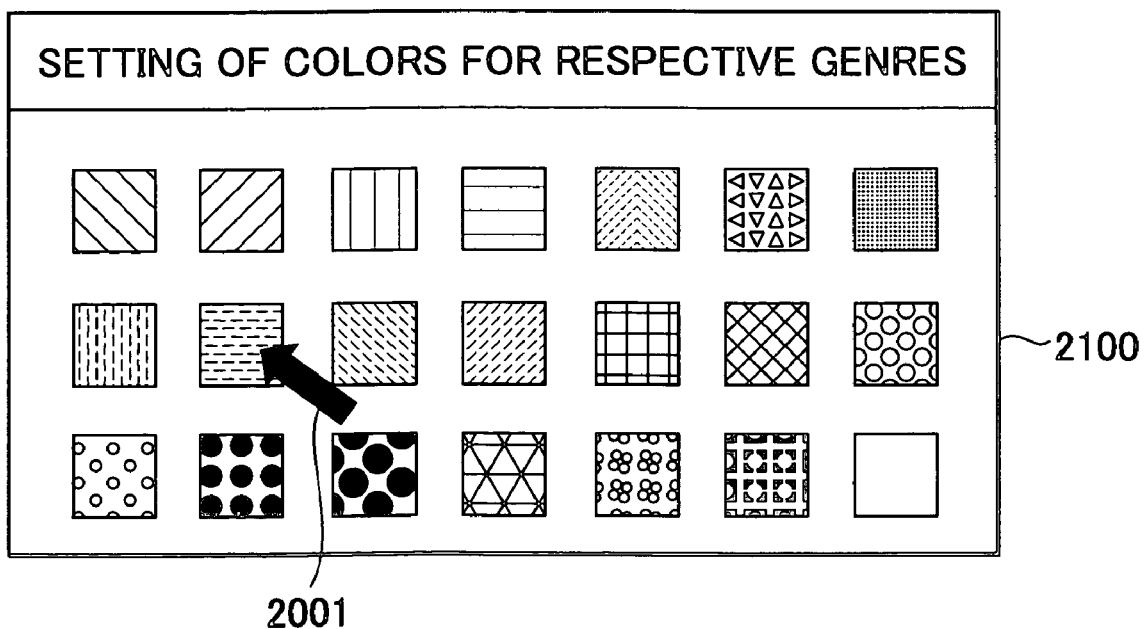
FIG. 28 is a diagram showing an example of a setting screen for use in specifying a color for a particular genre.

In response to pressing the enter button 1706, a setting screen 2100, such as that shown in FIG. 28, for use in designating a color appears. Via the setting screen 2100, the user can select an arbitrary color other than the color assigned as the color indicating that a program or a sub-program is registered for viewing/recording in the timer-controlled automatic operation mode.

If the user moves the cursor 2001 onto a desired color on the setting screen 2100 and presses the enter button 1706 on the remote control 215, the selected color is assigned to the selected genre.

Figure 29:
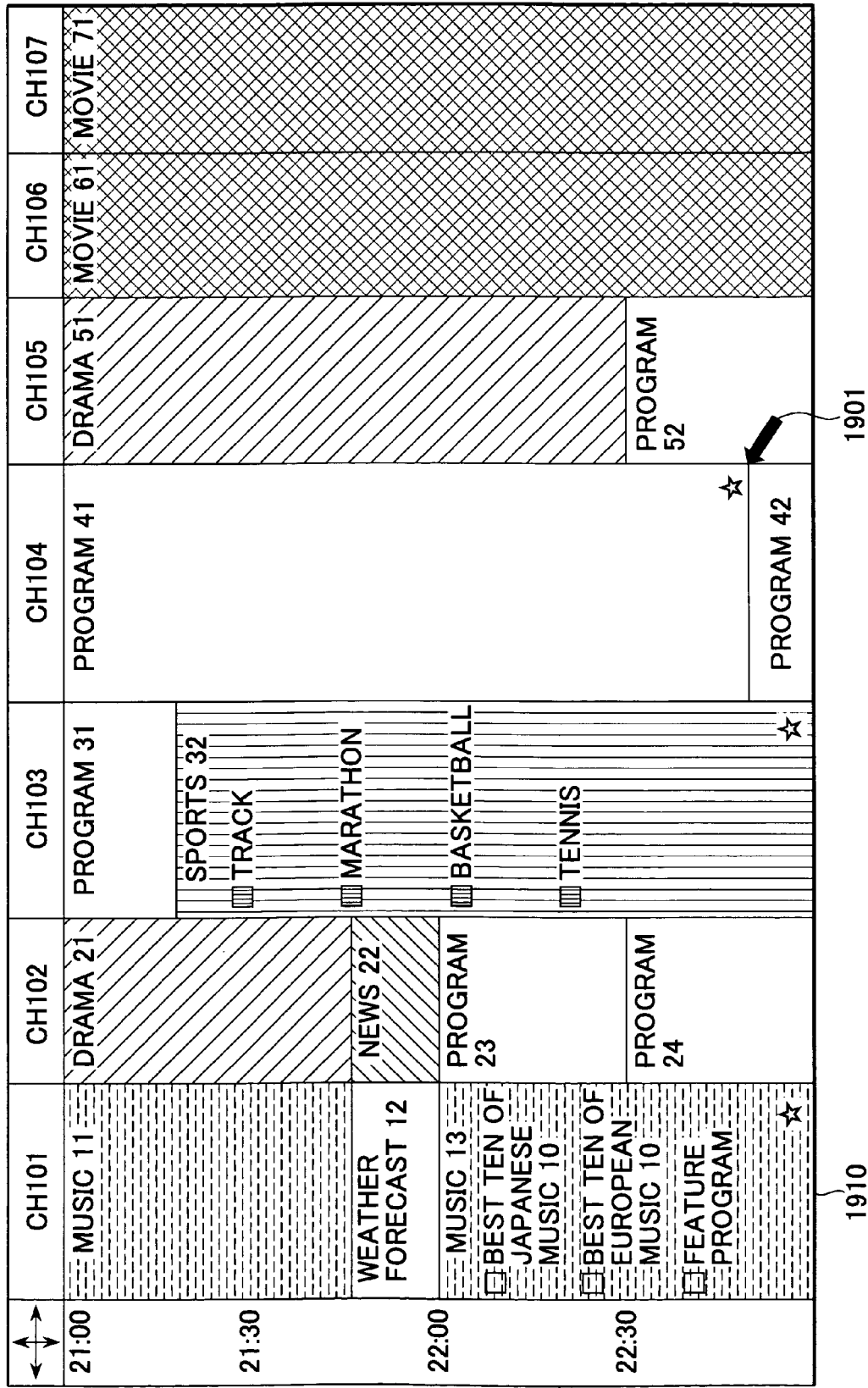
FIG. 29 is a diagram showing an example of an electronic program guide table in a state in which sub-program information is hidden.

FIG. 29 shows an EPG table 1910 obtained by hiding sub-program information of "program 41" in channel CH104 in the EPG table 1900 shown in FIG. 25. In the EPG table 1900, the user is allowed to select whether to display sub-program information in fields of corresponding programs. In accordance with selection specified by the user, the CPU 209 displays or hides sub-program information.

More specifically, if the user moves the cursor 1901 onto a star-shaped mark displayed in a field of a program ("program 41" in channel CH104 in this specific example) having a plurality of sub-programs on the EPG table 1900 shown in FIG. 25 and presses the enter button 1706 on the remote control 215, the sub-program information of "program 41" in channel CH104 being currently displayed disappears as shown in FIG. 29. Conversely, if the same star-shaped mark is selected and the enter button 1706 is pressed when the sub-program information is not displayed, the sub-program information appears.

Referring to FIGS. 30 and 31, the process of making a registration for timer-controlled viewing/recording via the EPG table is described below.

Herein, by way of example, let us assume that a user makes registration for timer-controlled viewing/recording of a sub-program of "sports" in "program 41" in channel CH104 on the EPG table 1920 shown in FIG. 30. Note that the processing of registration is performed under the control of the CPU 209.

First, as shown in FIG. 30, the user moves the cursor 1901 on the EPG table 1920 onto the colored mark indicating the genre of the sub-program of "sports" in "program 41" in channel CH104 and presses the enter button 1706 on the remote control 215. In response, "sports" in "program 41" in channel CH104 is set to be viewed/recorded in the timer-controlled automatic operation mode.

As a result, the color of the square-shaped mark indicating the genre of the sub-program "sports" is changed to black, and the color of the star-shaped mark indicating that sub-program information is available is changed to black.

Although in the present example, black is used as the color of square-shaped and star-shaped marks to indicate that a program or sub-programs is registered, the color is not limited to black, but any other color may be used, as long as the color can indicate that programs or sub-programs are registered for timer-controlled viewing/recording.

Marks indicating that sub-program information is available do not disappear even in the state in which the sub-program information itself is hidden. This makes it possible for the user to recognize whether a sub-program is registered even in the state in which sub-program information is not displayed. In the example shown in FIG. 31, although the sub-program information associated with "program 41" in channel CH104 is not displayed in the EPG table 1930, the star-shaped mark displayed in the field of "program 41" in channel CH104 allows the user to recognize that a sub-program in "program 41" is registered.

When the user wants to register a program including no sub-programs for time-controlled viewing/recording, registration can be performed simply by moving the cursor 1901 onto the field of that program and pressing the enter button 1706 on the remote control 215. In this case, the entire field of that program is shaded with a color indicating that the program is registered for timer-controlled viewing/recording.

In the case in which the user wants to register the whole of a program including a plurality of sub-program, such as "program 41" in channel CH104, for timer-controlled viewing/recording, registration can be performed by hiding the sub-program information in the above-described manner, moving the cursor 1901 to any position in the field of the program other than the star-shaped mark indicating that sub-program information is available although it is hidden, and pressing the enter button 1706 on the remote control 215.

FIG. 32 is a flow chart of a process performed by the CPU 209 when a user issues a command to make a registration of viewing/recording a particular program/sub-program. Note that the process described herein is not limited to a case in which registration of the timer-controlled automatic viewing/recording is performed for a sub-program in a program on the EPG table, but registration for a whole program including all sub-programs can be performed in a similar manner. Thus, in the following description the term "program" or "title" can be replaced with "sub-program" or "sub-title".

Step S2201. If a user selects a desired program to be registered for viewing/recording on the EPG table such as that shown in FIG. 25, the CPU 209 determines whether the start time of the program selected by the user is later than the present time. If and only if it is determined that the start time of the selected program is later than the current time, the process proceeds to step S2202. However, if it is determined that the start time of the selected program is not later than the current time (that is, if the start time of the selected program has already passed away), the process is ended.

Step S2202. In the case in which it is determined in step S2201 that the start time of the program selected by the user is later than the present time, the CPU 209 determines whether the start time of the selected program is equal to the start time of any other program that has already been registered. If such a program is detected, the process proceeds to step S2203. However, if no such program is detected, the process proceeds to step S2204.

Figure 33:
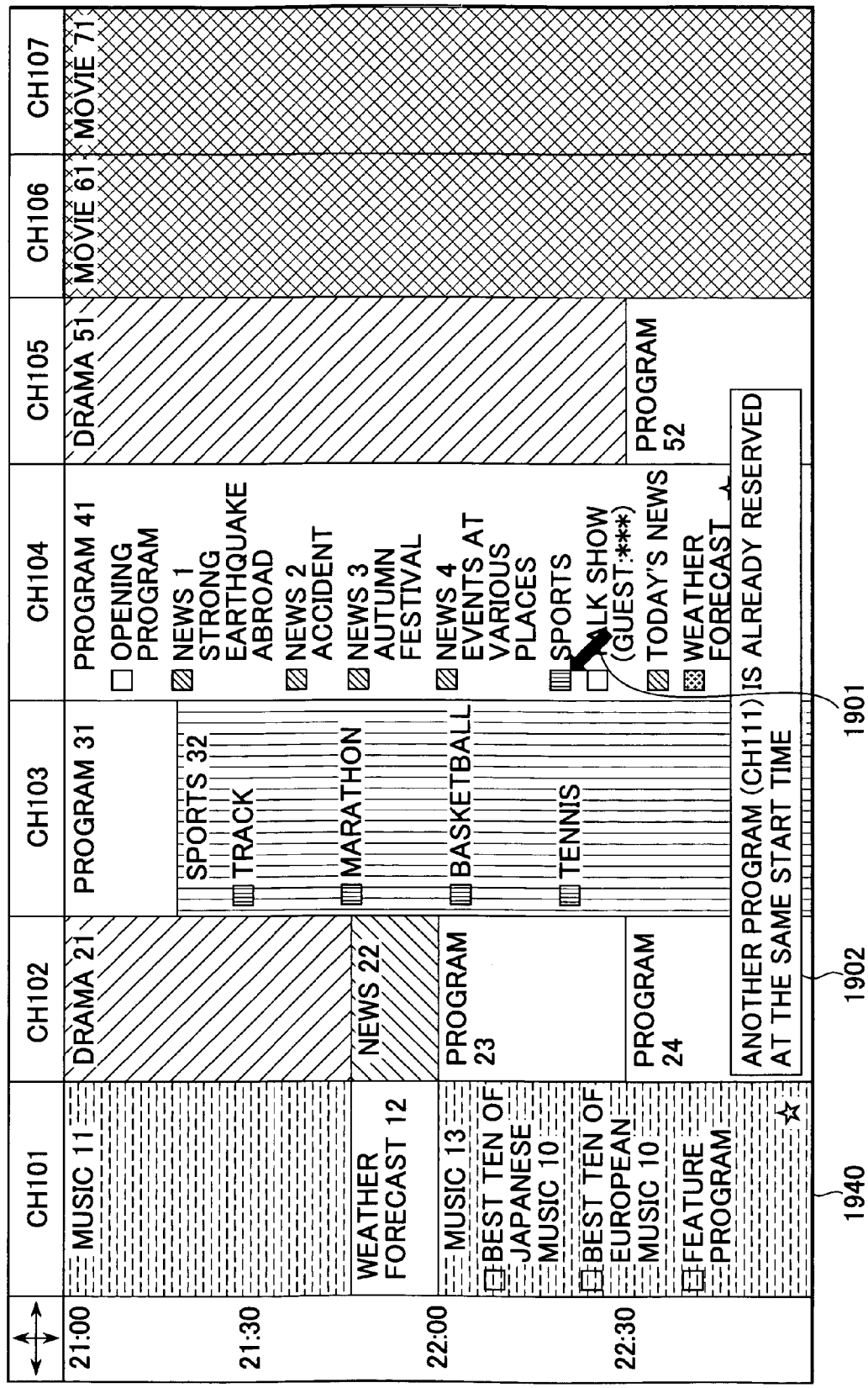
FIG. 33 is a diagram showing a warning message displayed on an electronic program guide table to inform a user that registration of a sub-program on an electronic program guide table will interfere with another already-registered program or sub-program having the same start time.

Step S2203. In the case in which an already-registered program with the same start time as that of the program selected by the user is detected in step S2202, the CPU 209 displays a warning message 1902 on the EPG table as shown in FIG. 33 to inform the user that another program that will start at the same time has already been registered. Thereafter, the process is ended.

Step S2204. In the case in which it is determined in step S2202 that there is no already-registered program with the same start time as that of the present program specified to be registered, the CPU 209 makes registration of the specified program and temporarily stores information associated with the program (information indicating the start time, channel number, etc. of the program) in an internal memory of the CPU 209. The CPU 209 then modifies the EPG table such that the user can recognize that the program selected by the user has been registered.

More specifically, as described above, in the case in which the whole of a program is registered, the CPU 209 shades the entire field of that program with a color to indicate that the program is registered. On the other hand, in the case in which a sub-program in a program is registered, the square-shaped mark indicating the genre of that sub-program is shaded with a color to indicate that the sub-program is registered, and furthermore the star-shaped mark indicating that sub-program information is available is also colored to indicate that the sub-program is registered.

Steps S2205 and S2206. The CPU 209 monitors the passage of time to detect the arrival of the start time of the registered program. If the CPU 209 detects that the registered program will start soon, the CPU 209 advances the process to step S2207.

Step S2207. The CPU 209 determines whether the channel number of a program currently being displayed on the display 219 is equal to the channel number of the registered program. If it is determined that the channel numbers are equal, the process is ended. However, if they are not equal to each other, the process proceeds to step S2208.

Steps S2208 and S2209. In the case in which it is determined in step S2207 that the channel number of the program being displayed on the display 219 is not equal to that of the registered program, the CPU 209 displays a message 611 on the screen 610 as shown in FIG. 9 to inform the user that the registered program will start soon (step S2208), and the CPU 209 starts counting the period of time during which the message is displayed (step S2209).

Step S2210. The CPU 209 determines whether the channel has been switched by the user to the channel of the registered program or sub-program. If switching of the channel is not detected, the process proceeds to step S2211. However, the process proceeds to step S2212, if switching of the channel is detected.

Step S2211. In the case in which it is determined in step S2210 that the channel number of the program being displayed is not switched by the user (viewer), the CPU 209 determines whether a predetermined period of time has elapsed since the displaying of the message was started in step S2208. If it is determined that the predetermined period has not elapsed yet, the process returns to step S2210 to repeat the operation from step S2210. However, if it is determined that the predetermined period has elapsed, the process proceeds to step S2212.

Steps S2212 and S2213. The CPU 209 deletes information associated with registration of timer-controlled automatic viewing/recording of the program from the internal memory of the CPU 209 (step S2212), and the CPU 209 deletes the message 611 indicating that the registered program will start soon such as that shown in FIG. 9 (step S2213). Thereafter, the process is ended. At this point of time, shading with colors in the field of the program, the square-shaped mark indicating the genre of the sub-program, and the star-shaped mark indicating that sub-program information is available are changed into original colors.

In the present embodiment, as described above, categorization is possible even in the case in which a television program includes various genres of sub-programs. Furthermore, in the EPG table, genres are indicated by colors so that the user can easily recognize the genres of programs and sub-programs.

Eighth Embodiment

In the seventh embodiment described above, the broadcast apparatus 100 transmits program information, in the form of a radiowave, including a program identification number, a program name, a broadcast channel, the genre of the program, a description of the program content such as a description of the cast or the like, a broadcast date, a broadcast start time, and a broadcast end time, wherein when a program includes a plurality of sub-programs, sub-program information of each sub-program is transmitted. On the basis of the program information and sub-program information transmitted from the broadcast apparatus 100, the television receiver 200 produces an EPG table such that when a program includes various genres of sub-programs, each sub-program is categorized into genres and resultant genres are expressed by colors thereby allowing the user to easily find a desired program or sub-program of a desired genre.

However, in the seventh embodiment, when an EPG table is produced by the television receiver 200 and displayed on the screen of the display 219 connected to the television receiver 200, program information or sub-program information of as many programs or sub-programs as possible is included in the EPG table, and the genres of all respective programs or sub-programs are expressed by colors. This is useful when a user wants to get information of various genres of programs or sub-programs. However, when a user wants to get information of only one genre of programs or sub-programs, displaying the other genres of programs or sub-programs makes it less easy to find a desired program or sub-program.

In the eighth embodiment, to avoid the above problem, when a user wants to get information of only one genre of programs or sub-programs, only program information or sub-program information of the specified genre is shaded with color. The construction and the operation of the television receiver 200 according to the present embodiment are described below.

The description given herein is focused on parts and operations that are different from those of the seventh embodiment.

FIG. 34 shows an example of an EPG table 2300 produced by the CPU 209 of the television receiver 200 according to the present embodiment. The EPG table 2300 includes genre tabs 2303, at the top of the table, for selecting a genre that is to be colored and also includes right and left slide tabs 2302 for sliding the genre tabs 2303 to the right or left to display a genre tab hidden on the left or right side.

If a user selects a desired genre tab 2303 with the cursor 2301 (after displaying the desired genre tab by using the left or right slide tab 2302, if the desired genre tab is hidden) and pressed the enter button 1706 on the remote control 215, the program information or sub-program information of the selected genre is colored.

The EPG table 2300 shown in FIG. 34 also has an "all genres" tab. If this tab is selected, program information/sub-program information of all genres is colored. The respective genre tabs 2303 are shaded with colors assigned to the corresponding genres so that the user can easily recognize the genres of fields in the EPG table 2300 by referring to the colors of genre tabs 2303.

FIG. 35 shows the EPG table in a state in which the "drama" tab is selected by the user in the EPG table 2300 shown in FIG. 34. More specifically, if the user moves cursor 2301 onto the "drama" tab on the EPG table 2300 and presses the enter button 1706 on the remote control 215, the "drama" tab is selected and the "drama" tab is displayed in the frontmost position.

In the EPG table 2310 shown in FIG. 35, of the program information and sub-program information included in the EPG table 2310, only program information and sub-program information of genre "drama" are shaded with color assigned to "drama", but program information and sub-program information of any other genre are not shaded with color.

Although in the present embodiment, a selected tab (the "drama" tab in this specific example) is displayed in the frontmost position to indicate that it is selected, the selected tab may be displayed in a different manner to indicate that it is selected. For example, the selected tab may be displayed at the left most position to the left of the "all genre" tab or may be framed.

FIG. 36 shows the EPG table in a state in which the slide tab 2302 on the EPG table 2310 shown in FIG. 35 is selected by a user by operating the remote control 215.

Herein, the genre tabs 2303 are displayed from the left to right in the same order as the order in which genres are described from the top to the bottom in the screen 2000 shown in FIG. 27 for specifying colors of the respective genres. The order in which the genre tabs 2303 are displayed from the left to right can be changed by changing the order in which the genres are displayed in the screen 2000 shown in FIG. 27.

In the EPG table 2310 in the state shown in FIG. 35, the "music" tab is not displayed although "music" is included in the genre table shown in FIG. 27. In this state, if the user wants to select "music" as the genre to be shaded with color, the user clicks the left slide tab 2302 with the cursor 2301 by operating the remote control 215 and presses the enter button 1706. In response, all genre tabs 2303 are slid to the left except for the "all genres" tab and a "music" tab appears at the rightmost position.

When a tab of a genre at the end of the genre table (the "music" tab 2303, in this specific example) is displayed at the rightmost position, if the left slide tab 2302 is clicked, no further sliding may occur or genre tabs may be slid in a cyclic manner (in this specific example, the genre tab of the genre at the top in the genre table may appear at the rightmost position). Although in the present embodiment, the "all genres" tab remains in the fixed position without being slid, the "all genres" tab may be slid together with the other genre tabs.

Figure 37:
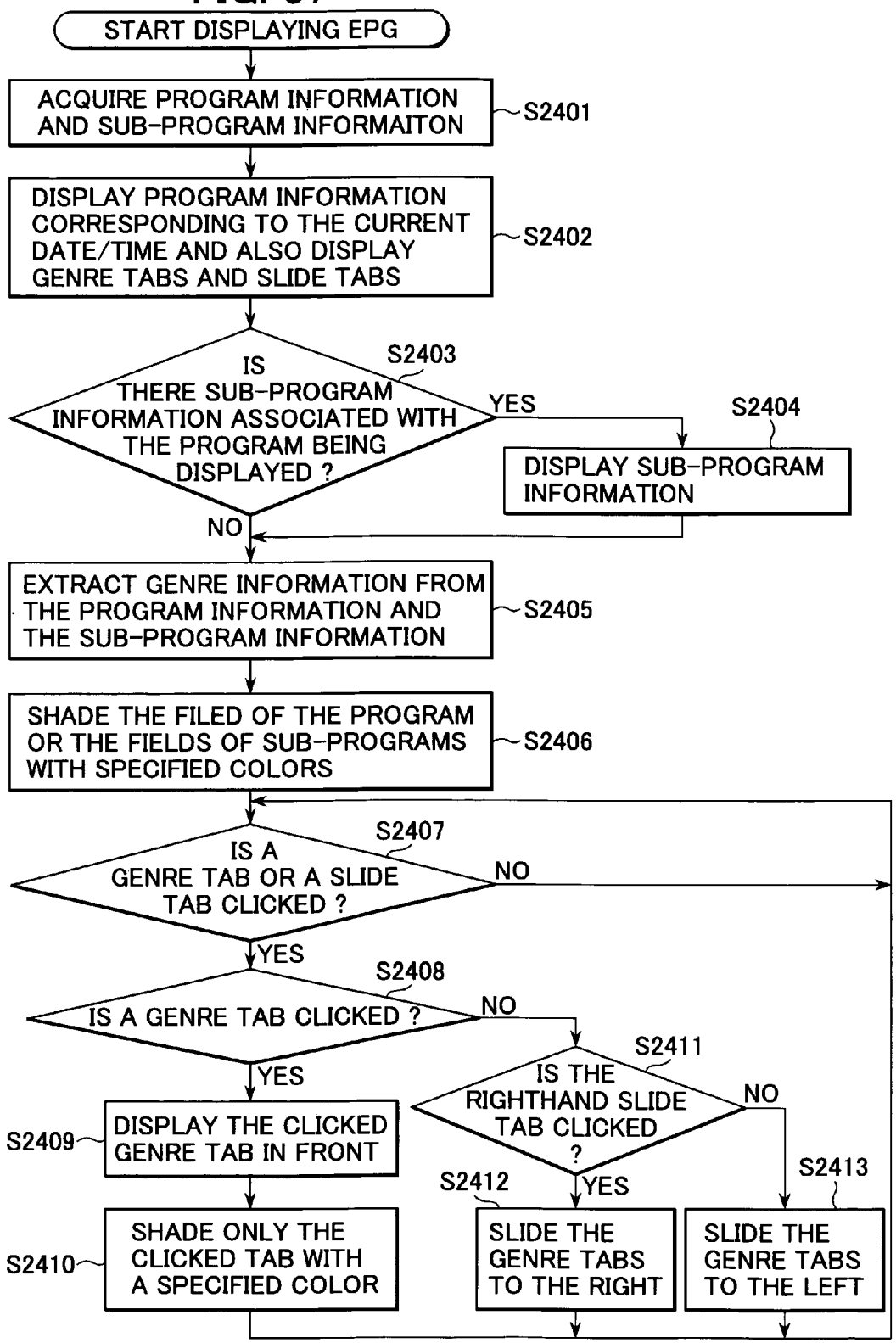
FIG. 37 is a flowchart showing a process performed by the television receiver.

FIG. 37 is a flow chart showing a process performed in the television receiver 200 to produce an EPG table on the basis of program information and sub-program information included in data transmitted from the broadcast apparatus 100, according to the present embodiment. More specifically, the television receiver 200 produces an EPG table by executing a program on the CPU 209 in accordance with the flow chart shown in FIG. 37 as described below.

Steps S2401 and S2402. The CPU 209 extracts program information and sub-program information to be used in producing an EPG table from the data received from the broadcast apparatus 100 (step S2401). The CPU 209 then produces an EPG table corresponding to the current date/time from the extracted program information and sub-program information and the CPU 209 adds genre tabs and slide tabs to the EPG table. The resultant EPG table is displayed on the display 219 (or the display disposed on the television receiver 200) (step S2402).

Step S2403. The CPU 209 determines whether there is sub-program information associated with a program in the EPG table produced in step S2402. If there is such sub-program information, the process proceeds to step S2404 and further to S2405. However, if there is no such sub-program information, the process directly proceeds to step S2405.

Step S2404. In the case in which it is determined in step S2403 that there is sub-program information associated with a program in the EPG table, the CPU 209 displays the sub-program information in a field of that program in the EPG table, and the CPU 209 further adds a mark thereto to indicate that sub-program information associated with that program is available.

Steps S2405 and S2406. The CPU 209 extracts genre information from the program information and the sub-program information acquired in step S2401 (step S2405). On the basis of the extracted genre information, the CPU 209 shades fields of respective programs or sub-programs with colors depending on the genre (step S2406).

Step S2407. The CPU 209 waits in step S2407 until the user clicks a genre tab 2303 or a slide tab 2302. If a genre tab 2303 or a slide tab 2302 is clicked, the process proceeds to step S2408.

Step S2408. The CPU 209 determines which type of tab, a genre tab or a slide tab, is clicked. If it is determined that a genre tab 2303 has been clicked, the process proceeds to step S2409. However, the process proceeds to step S2411 in the case in which a slide tab 2302 is clicked.

Steps S2409 and S2410. In the case in which it is determined in step S2408 that a genre tab 2303 has been clicked, the CPU 209 moves the clicked genre tab into the frontmost position (step S2409), and the CPU 209 shades fields of programs and rows of sub-programs of the selected genre with color assigned to that genre but the CPU 209 do not shade field of programs and rows of sub-programs of any other genre (step S2410). The process then returns to step S2407 to repeat the operation therefrom.

Steps S2411 to S2413. In the case in which it is determined in step S2408 that a slide tab 2302 has been clicked, the CPU 209 further determines which slide tab, the right slide tab or the left slide tab, has been clicked (step S2411). If it is determined that the right slide tab has been clicked, the genre tabs are slid to the right. However, if it is determined that the left slide tab has been clicked, the genre tabs are slid to the left (step S2413), and a genre tab in the hidden position is displayed at a position that has become vacant as a result of sliding. The process then returns to step S2407 to repeat the operation therefrom.

In the present embodiment, as described above, when a user wants to get information of only one genre of programs or sub-programs, only program information or sub-program information of the specified genre is shaded with color thereby allowing the user to easily select a desired program of a desired genre. Furthermore, the user can specify a desired genre to be shaded with color by clicking a corresponding genre tab. Because the genre tabs are shaded with colors assigned to the respective genres, the user can easily recognize the genres of programs from the color of fields of program or rows of sub-programs in the EPG table by referring to the color of the genre tabs.

The objects of the present invention may also be achieved by supplying a storage medium, on which a software program implementing the functions of any of the first to eighth embodiments described above is stored, to a system or an apparatus whereby a computer (CPU or MPU) in the system or apparatus reads and executes the program code stored on the storage medium.

In this case, it should be understood that the program code read from the storage medium implements the functions of the first to eighth embodiments and thus the storage medium storing the program code and the program code fall within the scope of present invention.

Specific examples of storage media which can be preferably employed in the present invention to supply the program code include a ROM, a floppy disk, a hard disk, an optical disk, a magneto-optical disk, a CD-ROM, a CD-R, a magnetic tape, and a nonvolatile memory card.

Furthermore, the functions according to any of the first to eighth embodiments of the present invention can be implemented not only by executing a program code on a computer, but also by performing a part or all of the process with an operating system (OS) running on the computer in accordance with the program code.

Furthermore, the scope of the present invention also includes a system or an apparatus in which a program code is transferred once from a storage medium into a memory provided in a function extension board inserted in a computer or provided in a function extension unit connected to the computer, and then a part or all of the process performed by a CPU or the like in the function extension board or the function extension unit in accordance with the program code thereby implementing the functions of any embodiment described above.

In the present invention, as described above, registration for timer-controlled viewing/recording is possible not only in units of programs but also in units of sub-programs.

Furthermore, even in the case in which a program includes various kinds of genres of sub-programs, the genre of each sub-program is expressed by color thereby allowing the user to easily find a desired sub-program of a desired genre.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for processing program content data and program information data associated with a television broadcast program received via receiving means, comprising:

display control means for displaying information on display means on the basis of the program information data such that when a program includes a plurality of sub-programs, sub-program information associated with sub-programs can be displayed on the display means;

processing means for performing a specified process on sub-program content data of a sub-program included in the program content data received by the receiving means; and timer-controlled automatic operation setting means for specifying a sub-program indicated by the sub-program information displayed on the display means and setting timer-controlled automatic operation for the specified sub-program such that the specified process is to be performed on the specified sub-program at a specified time, wherein the display control means has a first mode in which program information is displayed but the sub-program information is not displayed and a second mode in which sub-program information is displayed together with program information, the display control means being capable of switching the displaying mode between the first mode and the second mode, wherein in the first mode and in the second mode, the display control means displays the program information in the form of a program table on the display means and, in response to a determination that the program includes a plurality of sub-programs, further displays, in the program table, a mark indicating that the program includes a plurality of sub-programs, wherein each of the plurality of sub-programs has a different start time, and wherein the display control means switches the mode of displaying information from the first mode to the second mode in response to manual clicking on the mark.

2. An information processing apparatus according to claim 1, wherein if a sub-program is set to be subjected to a timer-controlled automatic operation by the timer-controlled automatic operation setting means, the display control means changes the form of displaying the mark.

3. A television program broadcast system including a television program broadcast station and a television receiver, wherein the television receiver functions as an information processing apparatus according to claim 1.

4. An information processing method for processing television broadcast program content data and program information data associated with a program received in a receiving step, comprising:

a display control step for displaying information on display means on the basis of the program information data such that when a program includes a plurality of sub-programs, sub-program information associated with sub-programs can be displayed on the display means;

a processing step for performing a specified process on sub-program content data of a sub-program included in the program content data received in the receiving step; and a timer-controlled automatic process setting step for specifying a sub-program indicated by the sub-program information displayed on the display means and setting timer-controlled automatic operation for the specified sub-program such that the specified process is to be performed on the specified sub-program at a specified time, wherein the display control step has a first mode in which program information is displayed but sub-program information associated with sub-programs is not displayed and a second mode in which sub-program information is displayed together with program information, the display control step being capable of switching the displaying mode between the first mode and the second mode, wherein in the first mode and in the second mode, the display control step displays the program information in the form of a program table on the display means and, in response to a determination that the program includes a plurality of sub-programs, further displays, in the program table, a mark indicating that the program includes a plurality of sub-programs, wherein each of the plurality of sub-programs has a different start time, and wherein the display control step switches the mode of displaying information from the first mode to the second mode in response to manual clicking on the mark.

* * * * *